United States Patent
Sato et al.

(10) Patent No.: US 7,280,320 B2
(45) Date of Patent: Oct. 9, 2007

(54) THIN-FILM MAGNETIC HEAD AND MANUFACTURING METHOD THEREOF

(75) Inventors: Kiyoshi Sato, Niigata-ken (JP); Hideki Gochou, Niigata-ken (JP); Hisayuki Yazawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 15 days.

(21) Appl. No.: 10/794,753

(22) Filed: Mar. 5, 2004

(65) Prior Publication Data

US 2004/0175588 A1 Sep. 9, 2004

(30) Foreign Application Priority Data

Mar. 7, 2003 (JP) .............................. 2003-060962

(51) Int. Cl.
*G11B 5/39* (2006.01)
*G11B 5/127* (2006.01)

(52) U.S. Cl. ....................... 360/317; 360/319; 360/320; 360/321; 428/811.5; 428/815; 428/816

(58) Field of Classification Search .................... None
See application file for complete search history.

(56) References Cited

U.S. PATENT DOCUMENTS 5,371,643 A   12/1994   Yuito et al.
5,809,636 A   9/1998    Shouji et al.
5,809,639 A   9/1998    Alvite
6,452,756 B1* 9/2002    Sasaki ........................ 360/317
6,462,915 B1  10/2002   Sasaki
6,671,133 B1* 12/2003   Sasaki ........................ 360/317
6,738,232 B1* 5/2004    Sasaki ........................ 360/317
7,083,989 B2* 8/2006    Sato ............................. 438/3

FOREIGN PATENT DOCUMENTS

| GB | 2 391 104 | 1/2004 |
| JP | 2000-155913 | 6/2000 |
| JP | 2000-163715 | 6/2000 |
| JP | 8-102016 | 8/2001 |
| JP | 2001-236614 | 8/2001 |
| JP | 2002-216314 | 8/2002 |

* cited by examiner

*Primary Examiner*—Kevin M. Bernatz
(74) *Attorney, Agent, or Firm*—Brinks Hofer Gilson & Lione

(57) ABSTRACT

A lower shield layer is formed by being embedded in a first recess formed in an under layer. Accordingly, the distance between the lower shield layer and a slider can be reduced. Also, a second metal layer is formed from above a gap layer covering an electrode extracting layer over above the under layer hindwards therefrom. Accordingly, the second metal layer can be brought closer to the slider side than an upper shield layer. Consequently, the thermal dissipation effects of the thin-film magnetic head can be improved.

14 Claims, 15 Drawing Sheets

THIN-FILM MAGNETIC HEAD AND MANUFACTURING METHOD THEREOF

This application claims the benefit of priority to Japanese Patent Application No. 2003-060962, herein incorporated by reference.

BACKGROUND OF THE INVENTION

1. Field of the Invention

The present invention relates to a thin-film magnetic head having a magnetoresistance effect element for example, and shield layers thereabove and thereunder, and particularly relates to a thin-film magnetic head with superb thermal dissipation.

2. Description of the Related Art

Thin-film magnetic heads mounted in hard disk devices and the like are generally compound type thin-film magnetic heads of reproducing MR heads which exhibit giant magnetoresistve effects and recording inductive heads formed of cores and coils. With MR heads, heat is generated by a detecting current flowing through a magnetoresistance effect element, and with inductive heads, heat is generated by a recording current flowing through a coil. The heat from each of these make the interior of the thin-film magnetic head hot, causing many problems such deterioration of reproduction properties by destroying the magnetoresistance effect element, causing the portion of the inductive head to protrude farther than the other portion due to difference in thermal expansion such that the thin-film magnetic head collides with the recording medium, and so forth. Accordingly, a thin-film magnetic head structure with superb thermal dissipation to lower the internal temperature of the thin-film magnetic head is urgently needed.

Examples of conventional art with improvement of thermal dissipation effects as the object thereof include Japanese Unexamined Patent Application Publication No. 2002-216314 and Japanese Unexamined Patent Application Publication No. 2001-236614.

With the arrangement disclosed in Japanese Unexamined Patent Application Publication No. 2002-216314, a first shield layer 31 provided below a MR element 9 is formed very long in the height direction from the face facing a recording medium, with hope that the portion of the first shield layer 31 extending in the height direction for a long distance (e.g., the portion thereof extending hindwards in the height direction beyond a hind connecting portion 42) will provide thermal dissipation effects.

However, in this arrangement, the first shield layer 31 is formed on a smoothed inorganic insulating film 710 formed on a slider 73, so the first shield layer 31 and the slider 73 are separated by the a distance equal to the thickness of the inorganic insulating film 710. The inorganic insulating film 710 is formed of $Al_2O_3$ or the like for example, but the thermal conductivity of $Al_2O_3$ is lower than that of metal film, so there is the problem that the heat transmitted to the first shield layer 31 cannot be efficiently discharged to the slider 73. As a result, the heat remains within the thin-film magnetic head, making the inside of the thin-film magnetic head hot, and accordingly cannot effectively solve the above-described problems of reproduction properties and head damage.

Also, forming the first shield layer 31 extended very long in the height direction to increase the area of the first shield layer 31 also causes the problem that the electron beam in the exposure step for forming the MR element 9 on the first shield layer 31 is bent due to the floating magnetic field emitted from the first shield layer 31, so the MR element 9 cannot be formed in the predetermined shape with high precision.

The arrangement disclosed in Japanese Unexamined Patent Application Publication No. 2001-236614 similarly has a lower magnetic shield 21 and a copper heat-radiating fin 26 behind this formed on a smoothed surface of an insulating layer 12 formed on a substrate 1. Accordingly, the distance between the lower magnetic shield 21 and copper heat-radiating fin 26, and the substrate 1 is widened, so heat transmitted to the lower magnetic shield 21 and copper heat-radiating fin 26 is not efficiently discharged to the substrate 1.

Also, forming the first shield layer 31 so as to be extended long in the height direction as with Patent Document 1, or forming the lower magnetic shield 21 and the copper heat-radiating fin 26 in contact as with Patent Document 2, may cause a part of the heat absorbed by the first shield layer 31 and copper heat radiating fin 26 to be transmitted to the side facing the recording medium, which may destroy the MR element.

Also, with the arrangement disclosed in Japanese Unexamined Patent Application Publication No. 2002-216314, the second shield film is formed extended long in the height direction in the same way as with the first shield film, but the entire second shield film is on an insulating layer covering the MR element, so the distance between the second shield film and the slider is even greater than that between the first shield film and the slider, so heat cannot be effectively discharged directly from the second shield film to the slider. Accordingly, the heat absorbed by the second shield film passes through the first shield film and is indirectly discharged to the slider, but indirect discharge does not allow the heat absorbed by the second shield film to be more effectively transmitted, so there is the possibility that the heat may still remain within the second shield film.

Also, an electrode extracting layer for supplying detecting current to the magnetoresistance effect element is connected to the magnetoresistance effect element, so the position for forming the electrode extracting layer needs to be taken into consideration in order to effectively reduce the distance between the second shield film and the slider, but this electrode extracting layer is neither disclosed nor even suggested in Japanese Unexamined Patent Application Publication No. 2002-216314, and the above-described problem is similarly unsolved by the art disclosed in Japanese Unexamined Patent Application Publication No. 2001-236614.

SUMMARY OF THE INVENTION

A thin-film magnetic head and manufacturing method thereof is provided for effectively reducing the distance between members having thermal dissipation capabilities and the substrate, to effectively improve thermal dissipation effects.

According to a first aspect of the present invention, a thin-film magnetic head comprises a lower shield layer and upper shield layer, and a magnetoresistance effect element between both shield layers; wherein the lower shield layer is formed on an under layer formed on a substrate, with a first recess, which extends in the height direction from the face facing a recording medium, formed in the under layer, and the lower shield layer formed within the first recess, and with a second recess which extends in the height direction, formed in the under layer distanced from the rear end face of the lower shield layer by a predetermined distance and behind in the height direction, and a first metal layer formed within the second recess; and wherein the upper face of the lower shield layer, the upper face of the under layer, and the upper face of the first metal layer are a same smoothed face.

With this thin-film magnetic head, the distance between the lower shield layer and the substrate can be effectively reduced, since the lower shield layer is formed embedded within the first recess formed in the under layer. Accordingly, heat generated within the thin-film magnetic head can be efficiently discharged from the lower shield layer to the substrate.

Also, the first metal layer is formed within the second recess formed in the under layer. This first metal layer functions as a thermal transmission layer for discharging to the substrate the heat, generated at the time of supplying detecting current to the magnetoresistance effect element or heat generated in the recording head portion in the event that a recording head portion is provided to the thin-film magnetic head, for example. Accordingly, heat can be effectively discharged from the first metal layer to the substrate by effectively reducing the distance between the first metal layer and the substrate by forming the first metal layer embedded in the second recess formed in the under layer.

Also, the bending of the exposing beam at the time of forming the magnetoresistance effect element can be suppressed by forming the lower shield layer separately from the first metal layer and forming the lower shield layer extremely small under the magnetoresistance effect element, thereby enabling the magnetoresistance effect element to be formed with high precision.

Further, the upper face of the lower shield layer, the upper face of the first metal layer, and the upper face of the under layer are of the same smoothed face, whereby the magnetoresistance effect element formed on the lower shield layer can be formed with even higher precision.

The first metal layer may be a nonmagnetic electroconductive material. Thus, the thermal conductivity of the first metal layer can be improved, and thermal dissipation effects can be improved since heat can be more readily transmitted to the first metal layer. Also, forming the first metal layer of a nonmagnetic electroconductive material prevents the floating magnetic field from the first metal layer from occurring, so bending of the exposing beam at the time of forming the magnetoresistance effect element can be effectively suppressed.

An electrode extracting layer for supplying electric current may be connected to the magnetoresistance effect element, with an insulating layer provided from above the magnetoresistance effect element over the electrode extracting layer, and with the first metal layer extending hindward from the insulating layer in the height direction, and the upper shield layer provided upon the insulating layer, wherein at least a part of a second metal layer provided at a position distanced in the height direction from the upper shield layer by a predetermined distance is formed connected to the first metal layer.

In this arrangement, the magnetoresistance effect element and above the electrode extracting layer are protected with the insulating layer, while the entire face of the first metal layer is kept from being covered by the insulating layer, thereby enabling at least a part of the second metal layer to be formed in contact with the upper face of the first metal layer. That is to say, the second metal layer can be formed below (on the substrate side) the position at which the upper shield layer is formed, thereby further improving the thermal dissipation effects.

Also, the second metal layer may extend in the height direction from the upper face of the insulating layer and bends downwards at the rear edge face of the insulating layer, and also extend hindwards from the insulating layer over the first metal layer. Thus, the second metal layer can be formed on the first metal layer in a sure manner, and the second metal layer can be formed over a wider area, thereby increasing the thermal capacity of the second metal layer.

According to a second aspect of the present invention, a thin-film magnetic head comprises a lower shield layer and upper shield layer, and a magnetoresistance effect element between both shield layers; wherein an electrode extracting layer for supplying electric current is connected to the magnetoresistance effect element, with an insulating layer provided from above the magnetoresistance effect element over the electrode extracting layer; and wherein the upper shield layer is formed upon the insulating layer, and wherein at least a part of a second metal layer provided at a position distanced in the height direction from the upper shield layer by a predetermined distance is formed on a layer lower than the upper face of the insulating layer extending hindwards in the height direction from the rear edge face of the insulating layer.

Thus, electrical short-circuiting of the extracting electrode layer and the second metal layer can be prevented, while forming the second metal layer below (on the substrate side) the position at which the upper shield layer is formed. Accordingly, the heat transmitted to the second metal layer can be efficiently dissipated to the substrate side.

Also, the second metal layer may extend in the height direction from the upper face of the insulating layer and bends downwards at the rear edge face of the insulating layer, and be formed over a layer lower than the upper face of the insulating layer, extending hindwards from the insulating layer. Thus, a part of the second metal layer can be formed on a layer lower than the insulating layer in a sure manner, and the area of the second metal layer can be formed wider, thereby increasing the thermal capacity of the second metal layer. Further, the lower layer may be an under layer formed on a substrate.

Also, a third recess may be formed on the under layer at a position where the second metal layer comes into contact with the upper face of the under layer, with the second metal layer being embedded in the third recess. Thus, the distance between the substrate and the second metal layer can be further reduced, thereby improving thermal dissipation effects.

Also, a first recess extending in the height direction from the face facing a recording medium may be formed in the under layer at a position closer to the facing face than the position at which the second metal layer is formed, with the lower sealed layer being formed within the first recess. Thus, the distance between the lower shield layer and the substrate can be further reduced, further improving thermal dissipation effects.

Further, a recording head portion, having a lower core layer, upper core layer, and coil layer, may be provided upon the upper shield layer, with a third metal layer formed separately from the lower core layer being provided behind the lower core layer in the height direction, at least part of the third metal layer formed coming into contact with the top of the second metal layer.

At this time, there may be a gap between the third metal layer and the second metal layer, with a connecting layer provided to at least a part of within the gap, so that the third metal layer and the second metal layer are connected via the connecting layer. Also, a recording head portion, having a lower core layer, upper core layer, and coil layer, may be provided upon the upper shield layer, with the lower core layer having a hindward region formed extending to a position facing the second metal layer in the film-thickness direction. Or, a gap may be formed between the hindward region of the lower core layer and the second metal layer, with a connecting layer provided to at least a part of within the gap, so that the hindward region and the second metal layer are connected via the connecting layer.

According to the above-described configuration, heat generated from the recording head portion can be effectively transmitted from the third metal layer (or the hindward region of the lower core layer) to the second metal layer (and further to the first metal layer in the event that a first metal layer is provided), thereby further improving thermal dissipation effects.

According to a third aspect of the present invention, a method for manufacturing a thin-film magnetic head comprises:

(a) a step for forming an under layer on a substrate;

(b) a step for forming in the under layer a first recess which extends in the height direction from the face facing a recording medium, and a second recess which extends in the height direction, in the under layer distanced from the first recess by a predetermined distance;

(c) a step for forming a lower shield layer by embedding in the first recess, and forming a first metal layer by embedding in the second recess;

(d) a step for forming the upper face of the lower shield layer, the upper face of the first metal layer, and the upper face of the under layer, as a same smoothed face; and (e) a step for forming a magnetoresistance effect element on the lower shield layer and forming an upper shield layer on the magnetoresistance effect element.

With the above-described configuration, the under layer can be used to embed the lower shield layer and first metal layer in the under layer, so there is no need to form an insulating layer for filling in between the lower shield layer and the first metal layer in addition. With conventional arrangements, formation of the lower shield layer on the under layer necessitated a step for filling in behind the lower shield layer with an insulating layer, but according to the manufacturing method of the present invention, the manufacturing costs are reduced as compared with the conventional art. Also, the above-described manufacturing method allows the distance between the substrate and the lower shield layer, and the distance between the substrate and the first metal layer, to be easily reduced.

The method may comprise the following steps instead of the Step (e):

(f) a step for forming on the lower shield layer a magnetoresistance effect element and an electrode extracting layer for supplying electric current to the magnetoresistance effect element;

(g) a step for forming an insulating layer from above the magnetoresistance effect element over the electrode extracting layer, with at least a part of the first metal layer extending hindward from the rear edge face of the insulating layer in the height direction exposed; and (h) a step for forming an upper shield layer on the insulating layer, and also forming a second metal layer on at least the exposed face of the first metal layer.

According to a fourth aspect of the present invention, a method for manufacturing a thin-film magnetic head comprises:

(i) a step for forming a magnetoresistance effect element on a lower shield layer, and further forming an electrode extracting layer for supplying electric current to the magnetoresistance effect element, following which an insulating layer is formed from above the magnetoresistance effect element over the electrode extracting layer, with at least a part of the upper face of a layer situated lower than the upper face of the insulating layer being exposed hindwards in the height direction from the rear edge face of the insulating layer; and (j) a step for forming an upper shield layer on the insulating layer, and also forming a second metal layer on at least the exposed face of the layer situated below.

With the above-described method, above the magnetoresistance effect element and the electrode extracting layer can be covered with the insulating layer in a sure manner, so the second metal layer can be formed at a position lower than the position at which the upper shield layer is formed, thereby reducing the distance between the second metal layer and the substrate with a simple method.

The following steps may be performed before the Step (i):

(k) a step for providing an under layer on a substrate;

(l) a step for forming in the under layer a first recess which extends in the height direction from the face facing a recording medium; and (m) a step for forming a lower shield layer by embedding in the first recess;

with the second metal layer being formed in the Step (j) on the exposed face of the under layer with the layer situated lower in the Step (i) as an under layer. Accordingly, the lower shield layer can be embedded within the under layer, so the distance between the lower shield layer and the substrate can be reduced with a simple method.

Moreover, at the time of any one of the steps prior to forming the second metal layer, a third recess extending in the height direction may be formed on the under layer at a position farther from the first recess in the height direction, and wherein the second metal layer is formed in the Step (j) by embedding in the third recess. In this case, the formation position of the second metal layer can be brought even closer to the substrate side.

With the thin-film magnetic head according to the present invention configured and manufactured thus, a lower shield layer is formed embedded at the side of an under layer on a substrate at the face facing the recording medium, with a first metal layer formed hindwards therefrom in the under layer by embedding, or a second metal layer is formed on the upper face of the under layer positioned lower than the upper face of the insulating film at a position hindwards form the insulating film covering an electrode extracting layer, whereby the distance between the lower shield layer and the substrate, and the distance between the first metal layer or the second metal layer and the substrate, can be both reduced at the same time, thereby enabling improvement of the thermal dissipation effects from both the forward region of the thin-film magnetic head occupied by the lower shield layer and the like, and the hindward region of the thin-film magnetic head occupied by the first metal layer and second metal layer and the like.

Thus, temperature rise within the thin-film magnetic head can be suppressed, providing for a thin-film magnetic head with excellent reproducibility, wherein the amount of protruding of the head from the face facing the recording medium can be suppressed.

DESCRIPTION OF THE PREFERRED EMBODIMENTS

Figure 1:
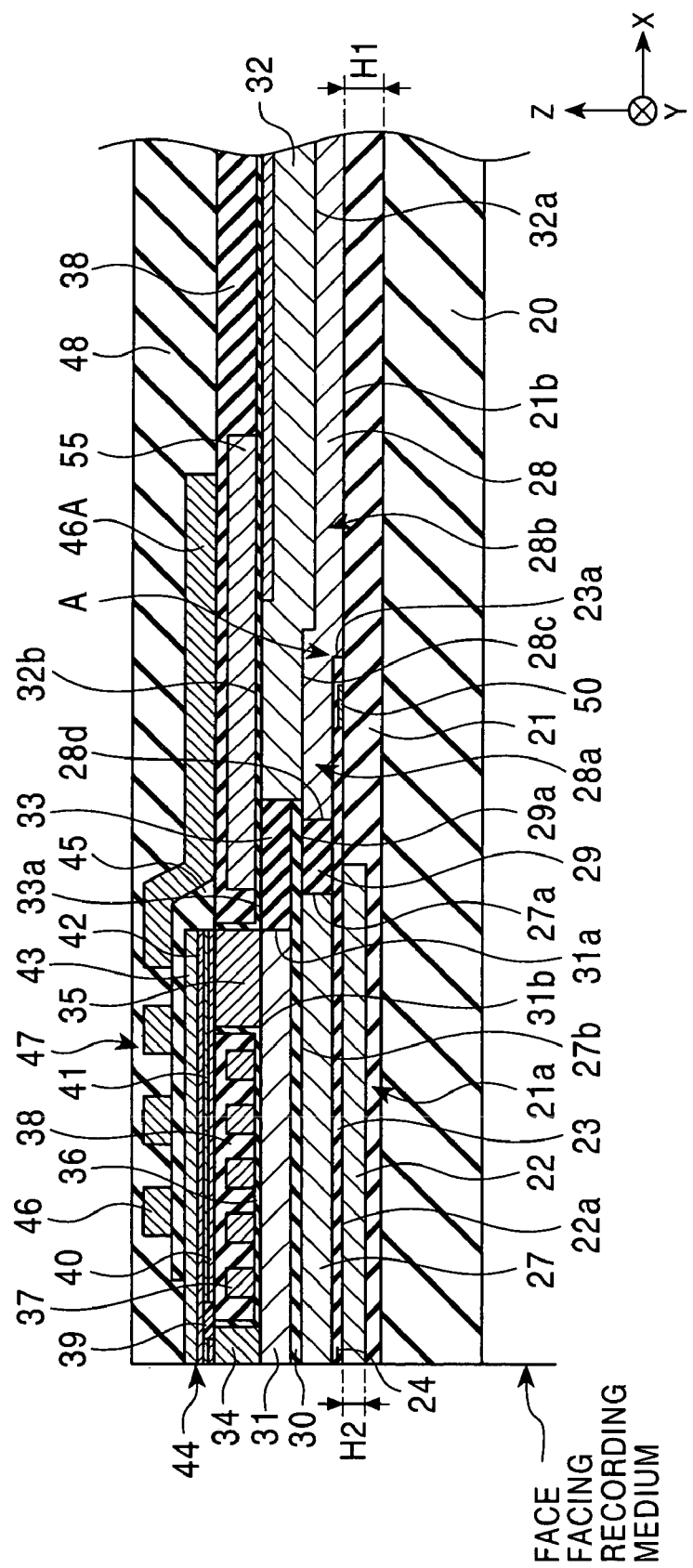
FIG. 1 is a partial longitudinal section view illustrating the structure of the thin-film magnetic head according to a first embodiment of the present invention.

FIG. 1 is a partial longitudinal section view illustrating the structure of the thin-film magnetic head according to a first embodiment of the present invention.

Note that in the following, the X direction in the drawing will be called the track width direction, and the Y direction in the drawing will be called the height direction. Also, the Z direction in the drawing is the direction of movement of the recording medium (magnetic disk). Also, the front edge face of the thin-film magnetic head (the face farthest to the left in FIG. 1) will be called the "face facing the recording medium". Further, in each layer, the term "front edge face" means the left side in FIG. 1, and the term "rear edge face" means the right side in FIG. 1.

Also, the thin-film magnetic head described with reference to the drawings is a thin-film magnetic head which is a compound type thin-film magnetic head of a recording head portion (also referred to as "inductive head") and a reproducing head portion (also referred to as "MR head").

Reference numeral 20 denotes a slider (substrate) formed of alumina-titanium-carbite ($Al_2O_3$—TiC) or the like, with an under layer 21 formed on the slider 20. The under layer 21 is formed of an insulating material of $Al_2O_3$ or the like. As shown in FIG. 1, the under layer 21 has a first recess 21a formed in the height direction from the face facing the recording medium. The maximum thickness H1 of the under layer 21 where the first recess 21a is not formed is 1.0 µm to 3.0 µm, and the maximum depth H2 of the first recess 21a is 0.5 µm to 1.5 µm.

As shown in FIG. 1, a lower shield layer 22 formed of NiFe alloy or Sendust or the like is embedded in the first recess 21a, and the upper face 22a of the lower shield layer 22 and the upper face 21b of the under layer 21 are formed as the same smoothed face.

A gap layer 23 formed of a lower gap layer and upper gap layer, formed of an insulating material of $Al_2O_3$ or the like is formed from above the lower shield layer 22 over the under layer 21.

A magnetoresistance effect element 24, a well-known example of which is a GMR element such as a spin valve thin-film element, is formed within the gap layer 23, so that the front edge face of the magnetoresistance effect element 24 protrudes from the face facing the recording medium. An upper shield layer 27 formed of an NiFe alloy or the like is formed on the gap layer 23.

A second metal layer 28, separately formed from the upper shield layer 27, is formed hindward of the rear edge face 27a of the upper shield layer 27 in the height direction. The forward region 28a of the second metal layer 28 at the face facing the recording medium is formed running up on the gap layer 23, and the hind region 28b of the second metal layer 28 is formed on the under layer 21, bending downwards from upon the gap layer 23 hindwards in the height direction. Between the upper shield layer 27 and the second metal layer 28 is filled in with an insulating material layer 29 of $Al_2O_3$ or the like. As shown in FIG. 1, the upper face 27b of the upper shield layer 27, the upper face 29a of the insulating material layer 29, and at least the upper face 28c of the second metal layer 28 formed extending over the gap layer 23, are formed in the same plane.

Note that the portion from the lower shield layer 22 to the upper shield layer 27 is called the reproducing head (also referred to as "MR head").

A separating layer 30 formed of $Al_2O_3$ or the like is formed upon the upper shield layer 27, as shown in FIG. 1. Note that an arrangement may be made wherein the separating layer 30 is not provided and the upper shield layer 27 functions as the lower core layer of the recording head portion.

In FIG. 1, a lower core layer 31 is formed on the separating layer 30. The lower core layer 31 is formed of a magnetic material such as an NiFe alloy or the like. The lower core layer 31 is formed to a predetermined length dimension in the height direction (the Y direction in the drawing) from the face facing the recording medium.

A third metal layer 32, formed separately from the lower core layer 31 is formed at a position distanced in the height direction from the rear edge face 31a of the lower core layer 31. The lower face 32a of the third metal layer 32 is formed in contact with the upper face of the second metal layer 28.

Also, as shown in FIG. 1, an insulating material layer 33 formed of $Al_2O_3$ or the like is embedded between the lower core layer 31 and the third metal layer 32, so that the upper face 31b of the lower core layer 31, the upper face 33a of the insulating material layer 33, and the upper face 32b of the third metal layer 32 situated at a position facing at least the gap layer 23 in the film thickness direction, are formed in the same plane.

As shown in FIG. 1, an uplifted layer 34 is formed on the lower core layer 31 from the face facing the recording medium with a predetermined lengthwise dimension in the height direction therefrom (the Y direction in the drawing). Further, a back-gap layer 35 is formed on the lower core layer 31 at a position distanced in the height direction (the Y direction in the drawing) from the rear edge face in the height direction of the uplifted layer 34.

The uplifted layer 34 and the back-gap layer 35 are formed of a magnetic material, which may be the same material as the lower core layer 31, or may be formed of a different material. Also, the uplifted layer 34 and the back-gap layer 35 may be singular layers, or may be formed as multi-layer layered structures. The uplifted layer 34 and the back-gap layer 35 are magnetically connected to the lower core layer 31.

As shown in FIG. 1, a coil insulating base layer 36 is formed on the lower core layer 31 between the uplifted layer 34 and the back-gap layer 35, with multiple first coil pieces 37 formed on the coil insulating base layer 36. The area above the first coil pieces 37 is filled in with a coil insulating layer 38 formed of an inorganic insulating material such as $Al_2O_3$. As shown in FIG. 1, the upper face of the uplifted layer 34, the upper face of the coil insulating layer 38, and the upper face of the back-gap layer 35, are a single smoothed face.

As shown in FIG. 1, a ground positioning layer 39 is formed in the height direction on the smoothed face of the uplifted layer 34 and the coil insulating layer 38, at a position distanced in the height direction (the Y direction in the drawing) from the face facing the recording medium by a predetermined distance.

Also, as shown in FIG. 1, a lower magnetic pole layer 40 and gap layer 41 are formed in that order from the bottom up, on the uplifted layer 34 from the face facing the recording medium to the front edge face of the ground positioning layer 39, on the coil insulating layer 38 from the rear edge face of the ground positioning layer 39 in the height direction, and on the back-gap layer 35. The lower magnetic pole layer 40 and gap layer 41 are formed by electroplating. Note that the dimensions of the gap layer 41 in the height direction are determined by the ground positioning layer 39.

Also, as shown in FIG. 1, an upper magnetic pole layer 42 is formed by electroplating on the gap layer 41 and the ground positioning layer 39, with an upper core layer 43 being further formed by electroplating on the upper magnetic pole layer 42.

Figure 5:
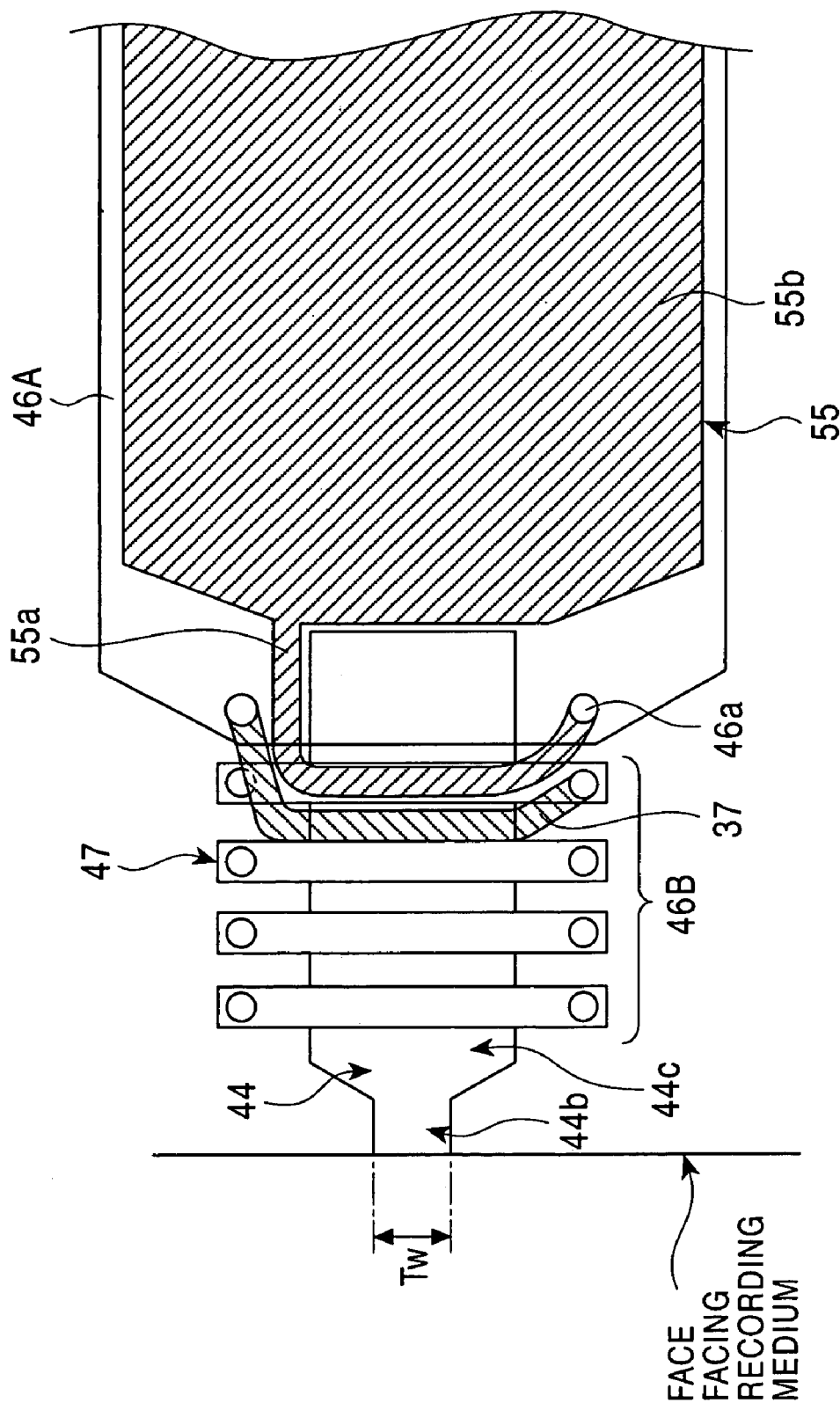
FIG. 5 is a partial plan view illustrating the planar configuration of primarily a toroidal coil layer, magnetic pole layer, and lead layer.

With the present embodiment, a magnetic pole layer 44 is configured of the four layers of the lower magnetic pole layer 40, the gap layer 41, the upper magnetic pole layer 42, and the upper core layer 43. The magnetic pole layer has a form such as shown in FIG. 5, for example, when viewed from above. A forward region 44b at the side of the magnetic pole layer 44 facing the recording medium is formed such that the width dimension in the track width direction (the X direction in the drawing) is narrower, and the track width Tw is determined by the dimensions of the track width direction of the forward region 44b at the face facing the recording medium. The track width Tw is 0.7 µm or less for example, and preferably is 0.5 µm or less. Also, the hind region 44c of the magnetic pole layer 44 is formed with the width from the base of the forward region 44b toward the track width direction so as to be wider facing the height direction (the Y direction in the drawing), so the area of the hind region 44c is sufficiently wider than the area of the forward region 44b.

As shown in FIG. 1, an insulating material layer 45 formed of an insulating layer, for example, such as resist, $Al_2O_3$, or the like, is formed on the upper core layer 43. The insulating material layer 45 is preferably formed of an inorganic insulating material.

Multiple second coil pieces 46 are formed on the insulating material layer 45, as shown in FIG. 1. The end portions of the first coil pieces 37 and the second coil pieces 46 are each electrically connected with each other in the track width direction, thereby forming a toroidal coil layer 47 having the first coil pieces 37 and the second coil pieces 46, wound with the magnetic pole layer 44 as the axis thereof. A protective layer 48 formed of an insulating material such as $Al_2O_3$, AlSiO, or the like, is formed on the toroidal coil layer 47.

The portions of the thin-film magnetic head shown in FIG. 1 which are the features of the present embodiment will now be described.

Figure 4:
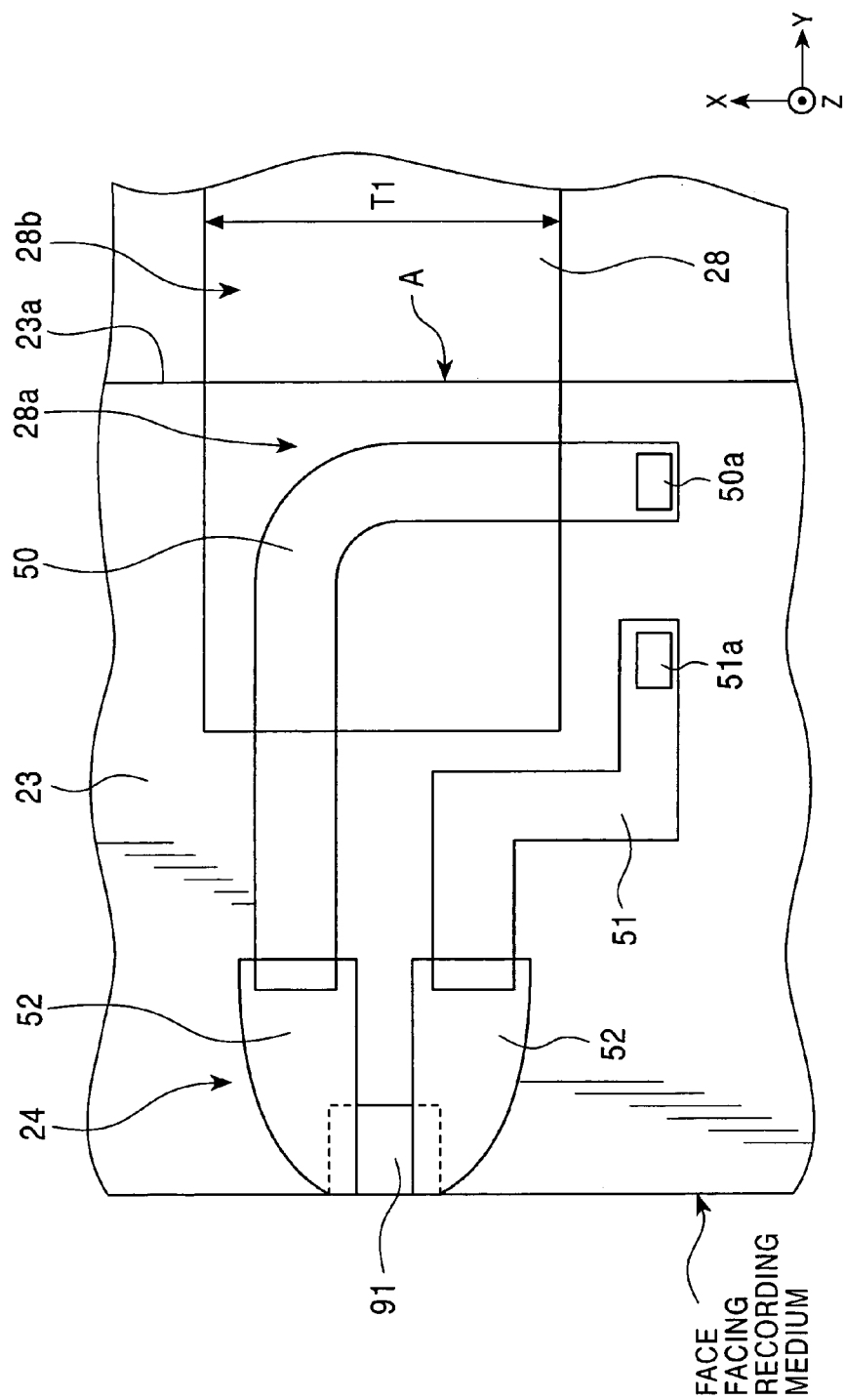
FIG. 4 is a partial plan view illustrating the position relation of primarily an magnetoresistance effect element, electrode extracting layers, and second metal layer.

An electrode extracting layer 50 for supplying detecting current is connected to the magnetoresistance effect element 24. The arrangement thereof is illustrated in FIG. 4 in detail. FIG. 4 is a partial plan view of the thin-film magnetic head shown in FIG. 1.

As shown in FIG. 4, the magnetoresistance effect element 24 is configured having: a multi-layer film 91 including the four layers of, for example, an antiferromagnetic layer, fixed magnetism layer, non-magnetic electroconductive layer, and free magnetism layer; hard bias layers (not shown) formed on both sides thereof in the track width direction; and electrode layers 52 formed on the hard bias layers. As shown in FIG. 4, the electrode layers 52 have respective electrode extracting layers 50 and 51 electrically connected thereto, the electrode extracting layers 50 and 51 being formed extending in the height direction. Also, the base portions 50a and 51a of the electrode extracting layers 50 and 51 are situated at positions further outside in the track width direction than directly behind the magnetoresistance effect element 24, with the base portions 50a and 51a being the connection portions thereof, and the electrode extracting layers 50 and 51 being electrically connected with terminal portions (not shown) formed on the protective layer 48 shown in FIG. 1 by bumps being formed or the like on these connection portions.

As shown in FIG. 1, above the magnetoresistance effect element 24 and above the electrode extracting layers 50 and 51 is covered with a gap layer 23. However, the gap layer 23 does not completely cover over the under layer 21 extending in the height side from the electrode extracting layers 50 and 51, and the rear edge face 23a of the gap layer 23 is cut off at a position where the rear end portions at the height side of the electrode extracting layers 50 and 51 are completely covered. Accordingly, a step A is formed between the upper face of the gap layer 23 and the upper face 21b of the under layer 21 extending hindwards therefrom.

As described above, the upper shield layer 27 is formed on the gap layer 23 at the side of the face facing the recording medium, and the second metal layer 28 is formed further hindwards in the height direction. The second metal layer 28 is formed with the forward region 28a thereof running up onto the gap layer 23, but bends downward at the step A portion, so the hind region 28b of the second metal layer 28 is formed on the upper face 21b of the exposed under layer 21, without being covered by the gap layer 23.

As shown in FIG. 4, the width dimensions of the second metal layer 28 in the track width direction are formed as T1, with the width dimensions T1 being formed to a magnitude such that the connection portions 50a and 51a of the electrode extracting layers 50 and 51 are not covered. That is to say, the connection portions 50a and 51a of the electrode extracting layers 50 and 51 are formed at positions so as to protrude outwards from the side of the second metal layer 28.

Moreover, as shown in FIG. 4, the electrode extracting layer 50 does burrow beneath the forward region 28*a* of the second metal layer 28, but the gap layer 23 exists between the electrode extracting layer 50 and the forward region 28*a* of the second metal layer 28, so the insulation between the electrode extracting layer 50 and the second metal layer 28 is maintained at a satisfactory level. On the other hand, the hind region 28*b* of the second metal layer 28 bends downwards behind the electrode extracting layers 50 and 51 and is formed on the under layer 21 which is one step lower than the gap layer 23, so the hind region 28*b* of the second metal layer 28 can be brought closer to the slider 20 than the forward region 28*a*.

The second metal layer 28 functions as a heat dissipation member for discharging Joule heat generated at the toroidal coil layer 47, heat generated at the time of supplying detecting current to the magnetoresistance effect element 24, and so forth, to the slider 20, and accordingly, as described above, the heat dissipation effects can be improved by the second metal layer 28 being brought closer to the slider 20.

Also, the second metal layer 28 is formed separately from the upper shield layer 27, thereby suppressing the effects of the heat absorbed by the second metal layer 28 as to the magnetoresistance effect element 24, so that the reproductivity of the magnetoresistance effect element 24 can be maintained at a satisfactory level.

The forward region 28*a* of the second metal layer 28 is shown in FIG. 1 as running up on the gap layer 23 surrounding the under layer 21 with the upper face exposed, which enables the hind region 28*b* of the second metal layer 28 to be formed on the entire face of the under layer 21 expanding hindwards of the gap layer 23 in a sure manner.

Also, the distance between the rear edge face 27*a* of the upper shield layer 27 and the front edge face 28*d* of the second metal layer 28 can be reduced, so that the heat absorbed by the upper shield layer 27 can be readily transmitted to the second metal layer 28.

Also, running up a portion of the second metal layer 28 on the gap layer 23 enables the thermal capacity of the second metal layer 28 to be increased by enlarging the area of the second metal layer 28, thereby enabling manufacturing of a thin-film magnetic head with even better thermal dissipation effects.

Also, with the embodiment shown in FIG. 1, the first recess 21*a* is formed in the under layer 21 at the side of the face facing the recording medium, and the lower shield layer 22 is embedded in this first recess 21*a*. Accordingly, the distance between the lower shield layer 22 and the slider 20 can be suitably reduced, and also, other layers such as the upper shield layer 27 on the lower shield layer 22 are brought closer to the slider 20, so the lower shield layer 22 and layers thereupon can readily discharge the heat absorbed thereby to the slider 20 side more efficiently. That is to say, with the first embodiment shown in FIG. 1, the distance between the lower shield layer 22 and the slider 20, and the second metal layer 28 and the slider 20, can each be effectively reduced, so the thermal discharge effects to the slider 20 can be improved from both the front region of the thin-film magnetic head which the lower shield layer 22 and the like occupy, and the hind region of the thin-film magnetic head which the second metal layer 28 and the like occupy.

Next, in the embodiment shown in FIG. 1, a third metal layer 32 is joined onto the second metal layer 28. Upon the third metal layer 32 absorbing the Joule heat and the like generated from the toroidal coil layer 47, the heat is transmitted to the second metal layer 28 below the third metal layer 32 and discharged to the slider 20. Forming the third metal layer 32 and the second metal layer 28 in direct contact improves the thermal transmission capabilities from the third metal layer 32 to the second metal layer 28, whereby heat can be efficiently discharged to the slider 20 side. Forming the third metal layer 32 in the same step as the lower core layer 31 is preferably since the number of steps can be reduced, but the third metal layer 32 may be formed in a separate step from the lower core layer 31. In this case, the third metal layer 32 is preferably formed of a non-magnetic electroconductive material. This non-magnetic electroconductive material is formed of one or multiple types selected from, for example, Au, Ag, Pt, Cu, Cr, Al, Ti, Sn, NiP, Mo, W, Pd, and Rh.

Next, the form of the toroidal coil layer 47 shown in FIG. 1 will be described. FIG. 5 illustrates a plan view primarily of the magnetic pole layer 44 and the toroidal coil layer 47.

As shown in FIG. 5, of the second coil pieces 46 making up the toroidal coil layer 47, the hindmost second coil piece 46A farthest from the face facing the recording medium in the height direction has a track-width-direction width and area wider than the second coil piece 46B in front.

The layers indicated by the hatched portion are the first coil pieces 37 and the lead layer 55. FIG. 5 only illustrates one first coil piece 37. As shown in FIG. 5, the lead layer 55 is formed below the hindmost second coil piece 46A, on the coil insulating base layer 36 in the same way as the first coil piece 37. The lead layer 55 is configured of a lead forward region 55*a* which is narrow in width, and a lead hind region 55*b* which is integrally formed with the lead forward region 55*a* and has a greater width in the track width direction than the lead forward region 55*a*, with the lead hind region 55*b* being provided at a position facing the hindmost second coil piece 46A in the film thickness direction (the Z direction in the drawing). The lead layer 55 is conductivity connected with the hindmost second coil piece 46A via a connecting portion 46*a*.

As shown in FIG. 5, forming the area of the hindmost second coil piece 46A and the lead layer 55 beneath to be larger than the other coil pieces allows the Joule heat and the like generated from the toroidal coil layer 47 to be more effectively absorbed by these layers. The hindmost second coil piece 46A, the lead layer 55, the third metal layer 32, and the second metal layer 28 are each formed at positions facing each other in the film thickness direction, so the heat absorbed by the hindmost second coil piece 46A and the lead layer 55 can be efficiently transmitted to the third metal layer 32 and the second metal layer 28, thereby enabling manufacturing of a thin-film magnetic head with even better thermal dissipation effects.

Figure 2:
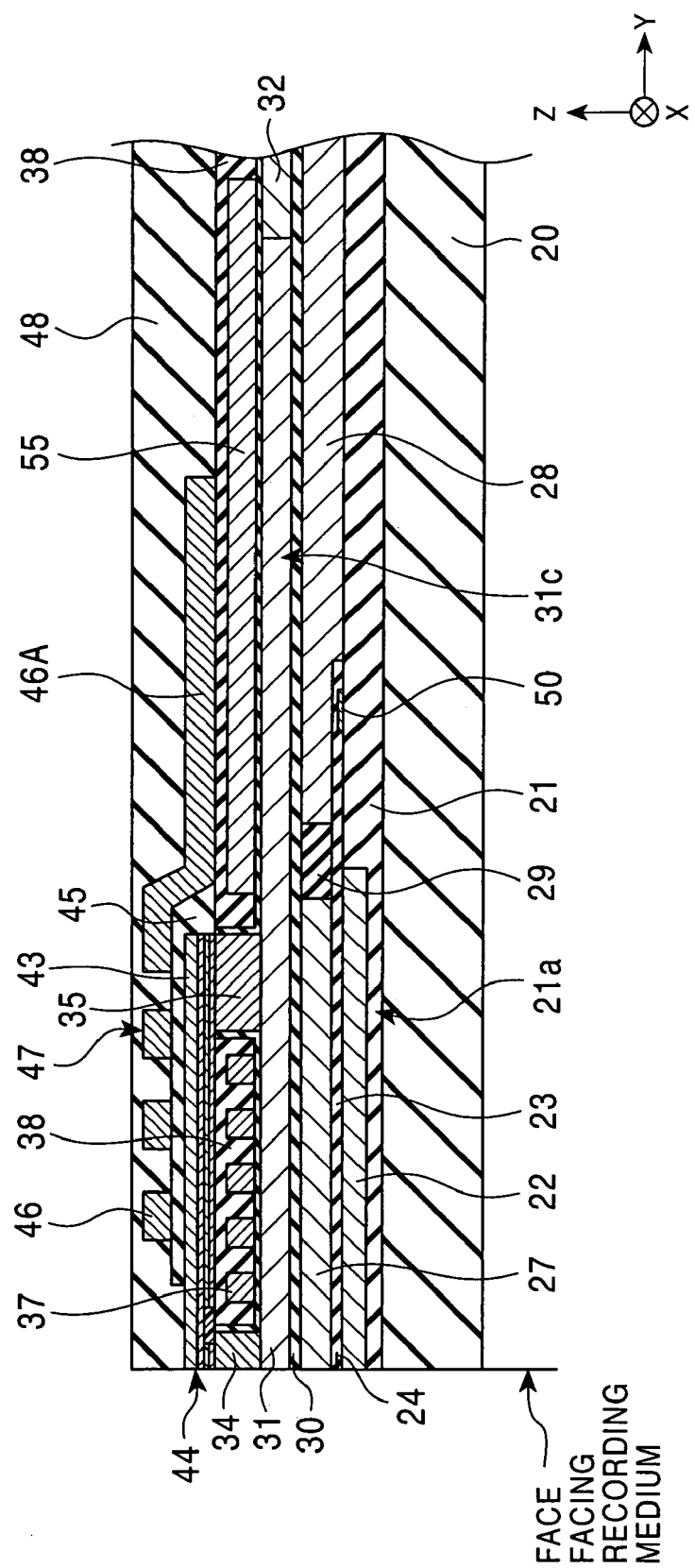
FIG. 2 is a partial longitudinal section view illustrating the structure of the thin-film magnetic head according to a second embodiment of the present invention.
Figure 3:
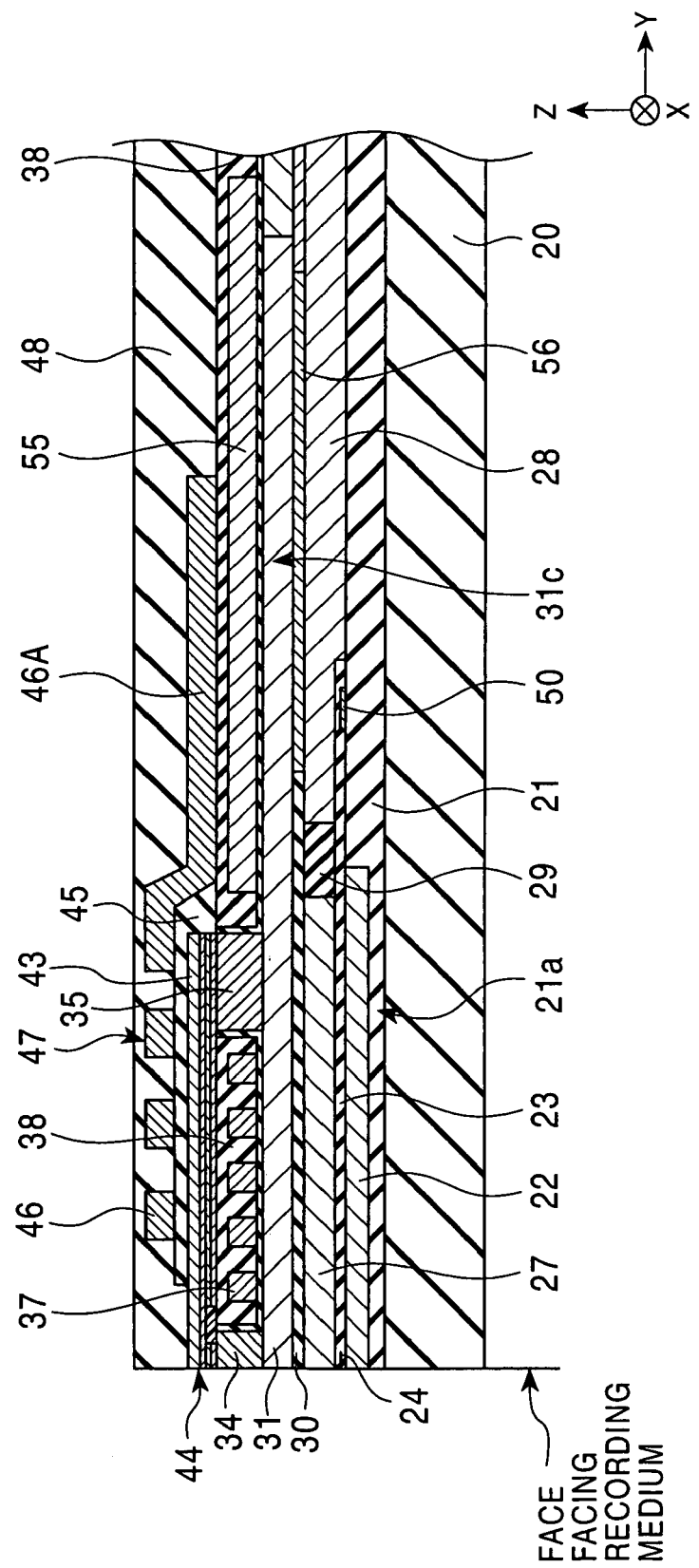
FIG. 3 is a partial longitudinal section view illustrating the structure of the thin-film magnetic head according to a third embodiment of the present invention.

FIG. 2 is a partial longitudinal section view illustrating the structure of the thin-film magnetic head according to a second embodiment of the present invention, and FIG. 3 is a partial longitudinal section view illustrating the structure of the thin-film magnetic head according to a third embodiment of the present invention. Note that layer which are the same as those illustrated in FIG. 1 are denoted by the same reference numerals.

In FIG. 2, the lower core layer 31 extends hindwards in the height direction further beyond the back-gap layer 35, so as to face the second metal layer 32 and the lead layer 55 in the direction of the film thickness, unlike the arrangement in FIG. 1.

Instead of forming the lower core layer 31 and the third metal layer 32 separately as in FIG. 1, a hind region 31c which extends to a position facing the second metal layer 32 and the lead layer 55 in the direction of the film thickness is provided on the lower layer 31 as shown in FIG. 2, whereby the heat generated by eddy current in the lower core layer 31, magnetic pole layer 44, uplifted layer 34, and back gap layer 35, can be dissipated more efficiently by being directly introduced to the hind region 31c of the lower core layer 31 itself, which is one of the heat sources. Also, extending the lower core layer 31 so as to be long in the height direction does not thermally affect the magnetoresistance effect element 24 due to thermal dissipation effects of the lower core layer 31, and there are no adverse affects on the reproduction properties. Increasing the thermal capacity by enlarging the area for example of the hind region 31c of the lower core layer 31 as compared to the forward region allows the thermal dissipation effects at the hind region 31c to be improved.

In FIG. 2, an insulating separating layer 30 exists between the hind region 31c of the lower core layer 31 and the second metal layer 28 below it. In the event that this separating layer 30 is excessively thick, the thermal transmission effectiveness from the hind region 31c to the second metal layer 28 deteriorates, so the thickness of the separating layer 30 is should be within the range of 0.15 μm to 0.4 μm.

However, an arrangement may be made as shown in FIG. 3, wherein a connecting layer 56 is formed to at least one part of the area between the second metal layer 28 and the hind region 31c of the lower core layer 31. Or an arrangement may be made wherein at least part of the separating layer 30 at the portion where the hind region 31c of the lower core layer 31 and the second metal layer 28 face one another in the thickness direction is removed, so that the hind region 31c and the second metal layer 28 are in direct contact thereat.

The connecting layer 56 is preferably formed of a non-magnetic electroconductive material. This non-magnetic electroconductive material is formed of one or multiple types selected from, for example, Au, Ag, Pt, Cu, Cr, Al, Ti, Sn, NiP, Mo, W, Pd, and Rh.

Connecting the second metal layer 28 and the hind region 31c of the lower core layer 31 through the connecting layer 56 improves the thermal transmission from the hind region 31c of the lower core layer 31 to the second metal layer 28, yielding a thin-film magnetic head with even better thermal dissipation. Also, at least one part of the hind region 31c of the lower core layer 31 may be formed in contact upon the second metal layer 28. In this case, a thin-film magnetic head with even better thermal dissipation can be manufactured even without providing the connecting layer 56.

Also, as shown in FIG. 1, in the event that the lower core layer 31 and the third metal layer 32 are formed separately, the separating layer 30 may exist between the third metal layer 32 and the second metal layer 28 as in FIG. 2, or the third metal layer 32 and the second metal layer 28 may be joined with the connecting layer 56 as shown in FIG. 3.

Figure 6:
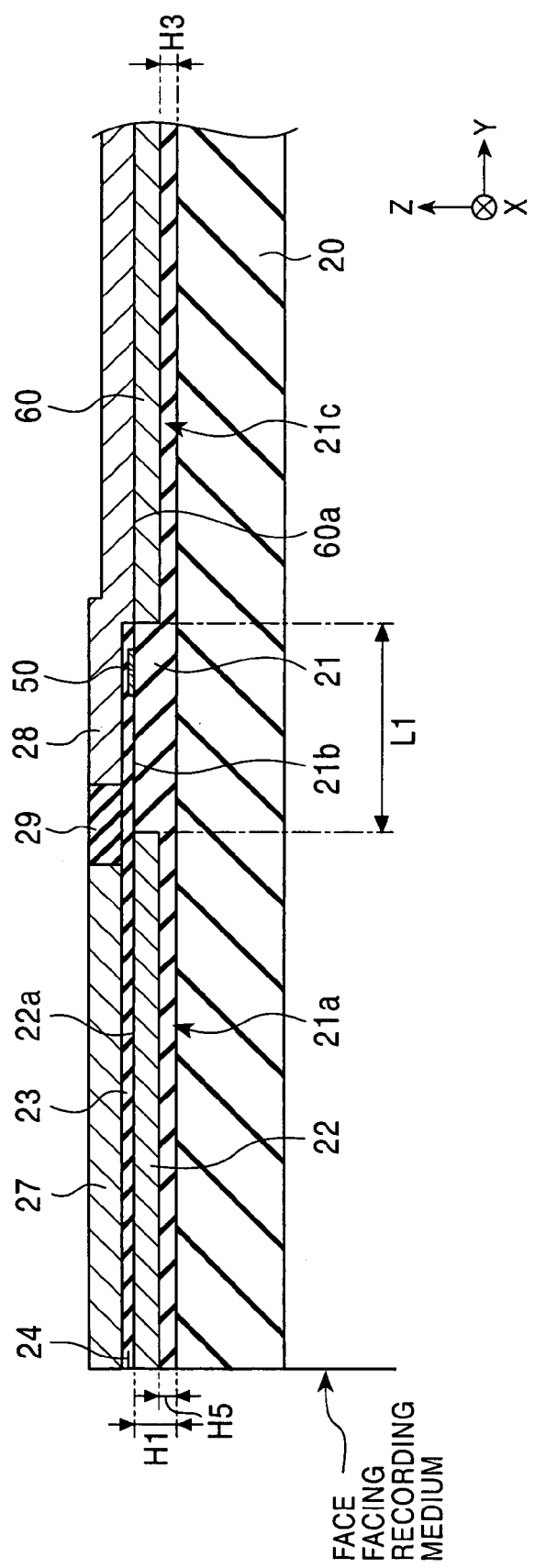
FIG. 6 is a partial longitudinal section view illustrating the structure of the thin-film magnetic head according to a fourth embodiment of the present invention.

FIG. 6 is a partial longitudinal section view illustrating the structure of the thin-film magnetic head according to a fourth embodiment of the present invention. While only the reproducing head (MR head) is shown in FIG. 6, the structure of the recording head provided on the reproducing head portion has already been illustrated by way of FIGS. 1 through 3, any arrangement of which may be employed, and accordingly the structure of the recording head has been omitted from the drawing. FIG. 6 will be described primarily with regard to the structure near the under layer 21, which is a structural feature.

With the thin-film magnetic head shown in FIG. 6, a first recess 21a is formed in the under layer 21 formed on the slider 20, extending in the height direction form the face facing the recording medium, with the lower shield layer 22 formed within this first recess 21a.

Further, a second recess 21c extending in the height direction is formed in the under layer 21 further hindwards in the height direction than the lower shield layer. A first metal layer 60 is formed within the second recess 21c.

As shown in FIG. 6, the upper face 22a of the lower shield layer 22, the upper face 21b of the under layer 21, and the upper face 60a of the first metal layer 60, are formed as the same smoothed face. Thus, forming the lower shield layer 22 by embedding in the first recess 21a formed in the under layer 21 allows the distance H5 between the slider 20 and the lower shield layer 22 to be reduced as compared to the film thickness H1 at the time of forming the under layer 21. In the same way, forming the first metal layer 60 by embedding in the second recess 21c formed in the under layer 21 allows the distance H3 between the slider 20 and the first metal layer 60 to be reduced as compared to the film thickness H1 at the time of forming the under layer 21.

As shown in FIG. 6, the distance between the lower shield layer 22 and the slider 20 can be reduced, so the heat which the lower shield layer 22 has absorbed can be efficiently discharged to the slider 20 side.

Also, the first metal layer 60 functions as a thermal dissipating member for discharging heat from the second metal layer 28 or third metal layer 32 formed thereupon or the like, to the slider 20 side, and reducing the distance between this first metal layer 60 and the slider 20 enables manufacturing of a thin-film magnetic head with even higher thermal dissipation effects. Note that the distances H3 and H5 are around 0.5 μm to 1.5 μm, and the film thickness H1 is around 2 μm to 4 μm.

Also, embedding the lower shield layer 22 and the first metal layer 60 both within the under layer 21 does away with the necessity to form an insulating material layer for filling in between the lower shield layer 22 and the first metal layer 60, which is necessary in the event that the lower shield layer 22 and the first metal layer 60 are formed on the smoothed face of the under layer 21. Accordingly, the manufacturing cost of the thin-film magnetic head can be reduced.

Also, forming the lower shield layer 22 and the first metal layer 60 separately allows the area of the lower shield layer 22 to be reduced, thereby suppressing bending of the exposing beam at the time of forming the magnetoresistance effect element 24, so the magnetoresistance effect element 24 can be formed in the predetermined shape.

Note however, that the first metal layer 60 is preferably formed of a non-magnetic electroconductive material. This non-magnetic electroconductive material is formed of one or multiple types selected from, for example, Au, Ag, Pt, Cu, Cr, Al, Ti, Sn, NiP, Mo, W, Pd, and Rh.

In an arrangement wherein the first metal layer 60 is formed of a non-magnetic electroconductive material, the thermal conductivity of the first metal layer 60 can be further improved, and heat can be discharged from the first metal layer 60 to the slider 20 more efficiently.

Also, in an arrangement wherein the first metal layer 60 is formed of a non-magnetic electroconductive material, there is no floating magnetic field generated from the first metal layer 60 at the time for forming the magnetoresistance effect element 24, so there is no adverse affect on the exposing beam, and the magnetoresistance effect element 24 can be formed in the predetermined form more easily. However, the first metal layer 60 and the lower shield layer 22 are preferably formed with a certain distance therebetween in the height direction. This is to prevent adverse affects of the heat absorbed by the first metal layer 60 on the magnetoresistance effect element 24. Accordingly, even in the event that the first metal layer 60 is formed of a non-magnetic electroconductive material, the spacing L1 between the lower shield layer 22 and the first metal layer 60 is preferably within the range of 2 μm to 10 μm.

With the embodiment shown in FIG. 6, a gap layer 23 is formed covering above the magnetoresistance effect element 24 and the electrode extracting layers 50 and 51 (see FIG. 4) for supplying detecting current to the magnetoresistance effect element 24, with the upper shield layer 27 formed on the gap layer 23, as with the embodiments illustrated in FIGS. 1 through 3.

The gap layer 23 does not cover all of the upper face 60a of the first metal layer 60 formed in the second recess 21c of the under layer 21, and at least a part of the upper face 60a of the first metal layer 60 is exposed from the gap layer 23. The second metal layer 28 of the upper gap layer 27 formed separately in the height direction extends in the height direction from the gap layer 23, bends downward at the rear end face of the gap layer 23, and extends onto the first metal layer 60. Thus, forming the second metal layer 28 in direct contact on the first metal layer 60 enables the heat which the second metal layer 28 has absorbed to be efficiently transmitted to the first metal layer 60, so a thin-film magnetic head with even better thermal dissipation effects can be manufactured.

In the same way as with FIGS. 1, 2, 3, and 6, the second metal layer 28 may be formed with a ferromagnetic material the same as with the upper shield layer 27, but in order to further effectively increase the thermal conductivity of the second metal layer 28, the second metal layer 28 is preferably formed of a non-magnetic electroconductive material. This non-magnetic electroconductive material is one or multiple types selected from, for example, Au, Ag, Pt, Cu, Cr, Al, Ti, Sn, NiP, Mo, W, Pd, and Rh.

However, with the embodiment shown in FIG. 6, the second metal layer 28 does not need to be formed. Also, the gap layer 23 may completely cover the upper face of the first metal layer 60, and the second metal layer 28 may be formed on the smoothed face of the gap layer 23 formed on the first metal layer 60.

Figure 7:
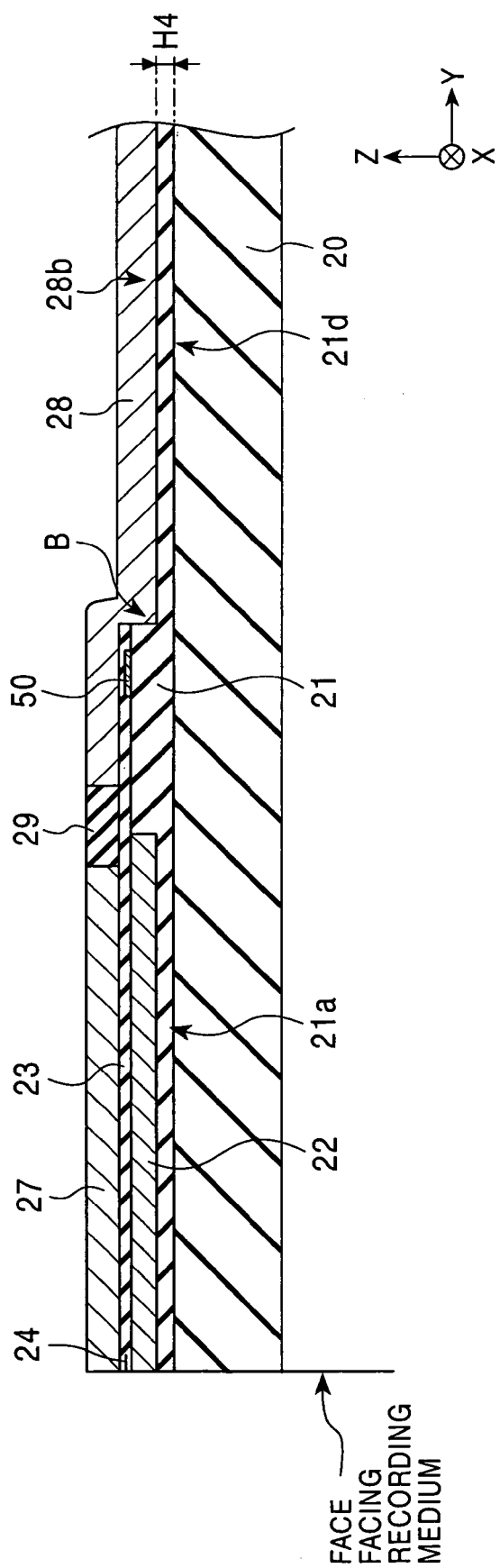
FIG. 7 is a partial longitudinal section view illustrating the structure of the thin-film magnetic head according to a fifth embodiment of the present invention.

FIG. 7 is a partial longitudinal section view illustrating the structure of the thin-film magnetic head according to a fifth embodiment of the present invention. The point that differs from the thin-film magnetic head shown in FIG. 6 is that a third recess 21d is formed in the under layer 21 further hindwards in the height direction than the lower shield layer 22 formed embedded in the first recess 21a formed in the under layer 21, and a hind region 28b of the second metal layer 28 formed extending in the height direction from above the gap layer 23 covering over the magnetoresistance effect element 24 and the electrode extracting layer 50 bends downwards at a step B between the gap layer 23 and the third recess 21d and is formed embedded within the third recess 21d. Embedding the hind region 28b of the second metal layer 28 in the third recess 21d enables the hind region 28b of the second metal layer 28 and the slider 20 to be brought into closer proximity. With the embodiment shown in FIG. 7, the distance H4 between the hind region 28b of the second metal layer 28 and the slider 20 can be formed within the range of 0.5 μm to 1.5 μm.

With the embodiment shown in FIG. 7, the hind region 28b of the second metal layer 28 can be brought closer to the slider 20 than with the embodiments shown in FIGS. 1 through 3. Accordingly, the thermal dissipation effects from the second metal layer 28 can be improved more effectively.

Now, with the recording head portion shown in FIGS. 1 through 3, there are an uplifted layer 34 and back-gap layer 35 on the lower core layer 31, forming between the uplifted layer 34 and back-gap layer 35 a magnetic pole layer 44 which is configured of the four layers of the lower magnetic pole layer 40, the gap layer 41, the upper magnetic pole layer 42, and the upper core layer 43, wherein the coil is a toroidal coil layer 47 formed by being wound with the magnetic pole layer 44 as the axis thereof, but the arrangement of the recording head portion may be any arrangement. For example, the coil may be a spiral coil wound in a helical manner in a planer fashion around the back-gap layer 35, rather than a toroidal coil layer 47.

Figure 8:
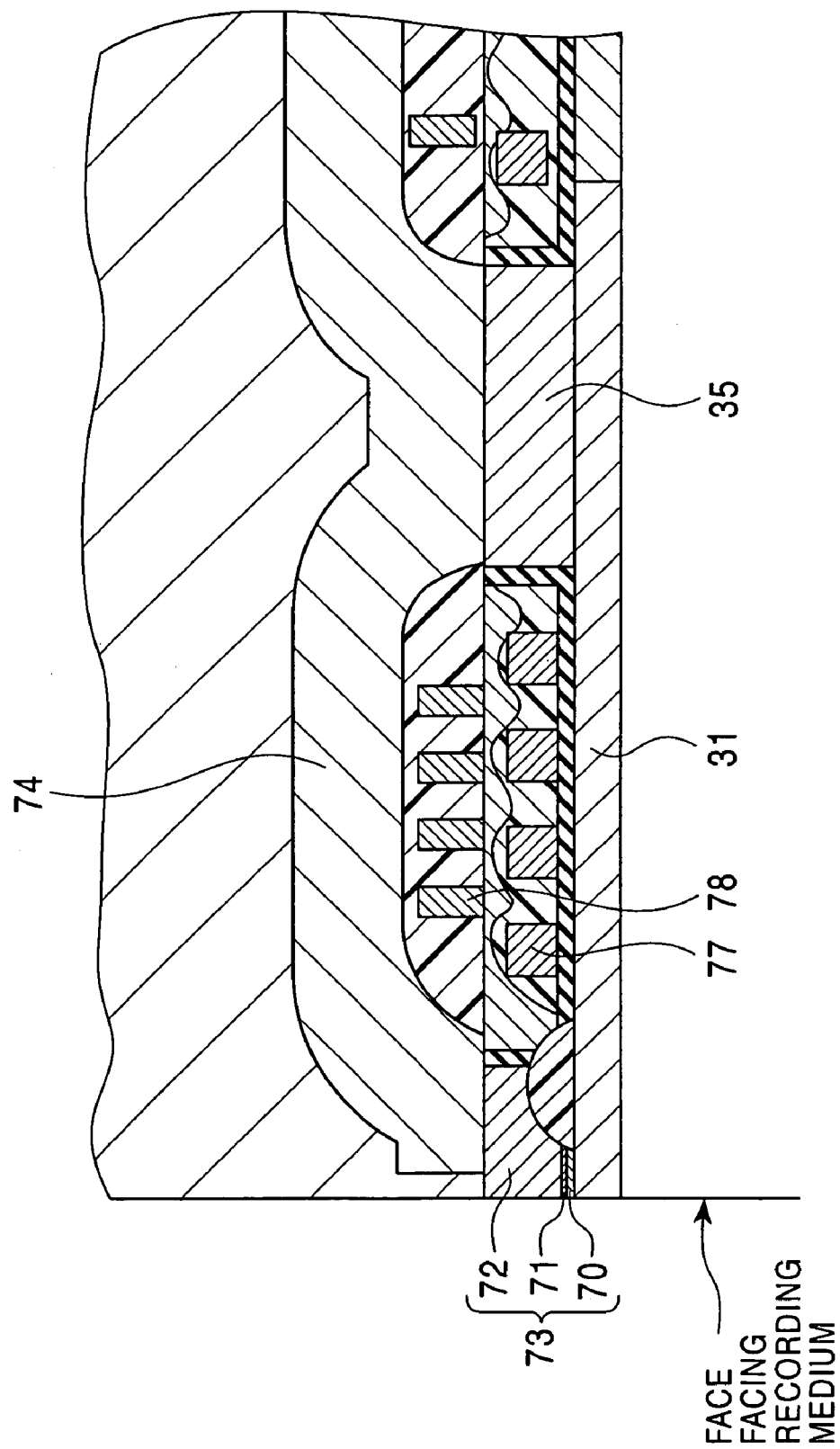
FIG. 8 is a partial longitudinal section view illustrating another arrangement of a recording head according to the present invention.
Figure 9:
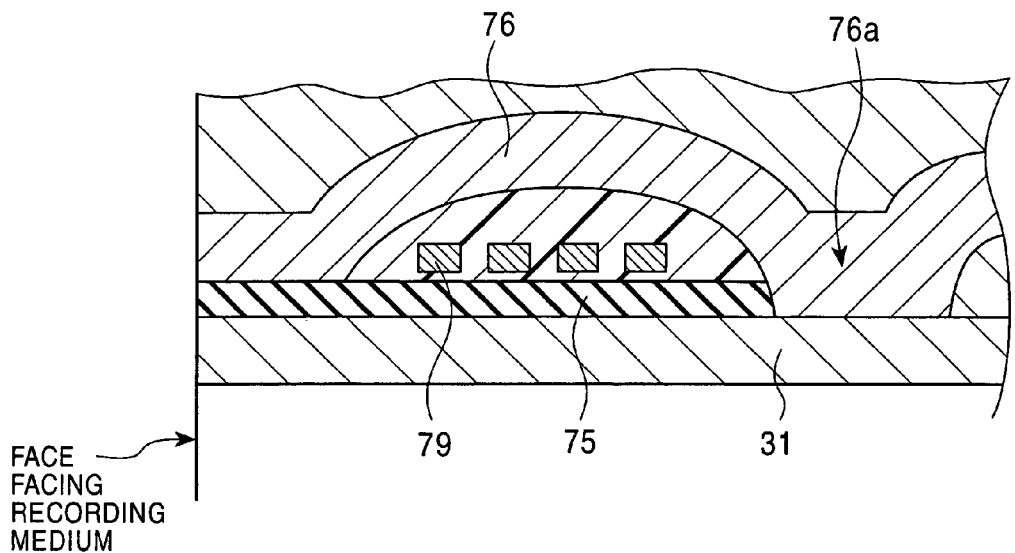
FIG. 9 is a partial longitudinal section view illustrating another arrangement of a recording head according to the present invention.

Also, an arrangement may be made such as shown in FIG. 8 wherein a magnetic pole portion 73 formed of, in order from the bottom up, a lower magnetic pole layer 70, gap layer 71, and upper magnetic pole layer 72, at the side of the lower core layer 31 facing the recording medium, with the back-gap layer 35 formed at the height side and the upper magnetic pole layer 72 and the back-gap layer 35 being magnetically connected with the upper core layer 74, or an arrangement such as shown in FIG. 9 wherein the upper core layer 76 faces the lower core layer 31 across the gap layer 75 at the side facing the recording medium, with the base portion 76a of the upper core layer 76 being magnetically connected with the lower core layer 31. The coils 77, 78, and 79 shown in FIGS. 8 and 9 are all spiral coils.

The thin-film magnetic head according to the present invention with reference to FIGS. 1 through 9 enables the distance between the lower shield layer 22 and the slider 20 to be reduced as compared with conventional arrangements, and also, the second metal layer 28 formed separately from the upper shield layer 27 can be formed lower than the position where the upper shield layer 27 is formed, thereby reducing the distance between the second metal layer 28 and the slider 20.

Or, with the embodiment shown in FIG. 6, the first metal layer 60 formed separately from the lower shield layer 22 can be formed embedded in a recess formed in the under layer 21 along with the lower shield layer 22, thereby reducing the distance between the first metal layer 60 and the slider 20 as compared to conventional arrangements.

Thus, with the present invention, the entirety of the lower shield layer 22 and the upper shield layer 27 and the like formed thereabove can be brought closer to the slider 20, and also the first metal layer 60 and second metal layer 28 and the like provided in the rear region of the lower shield layer 22 can also be brought closer to the slider 20, so the region ahead of the thin-film magnetic head occupied by the lower shield layer 22 and the like, and the region hindwards of this, can both have effectively improved thermal dissipation effects, thereby preventing the temperature within the thin-film magnetic head from becoming hot.

As a result, the reproducibility of the magnetoresistance effect element 24 does not deteriorate due to heat, and protrusion of the recording head due to thermal expansion can be prevented.

The method for manufacturing the thin-film magnetic head shown in FIG. 1 will now be described. FIGS. 10 through 13 are partial longitudinal section views illustrating the manufacturing steps of the thin-film magnetic head shown in FIG. 1. Note that the step drawings relate to the manufacturing method from the under layer up to the upper shield layer, and the manufacturing method of the recording head portion and so forth further up will be omitted.

Figure 10:
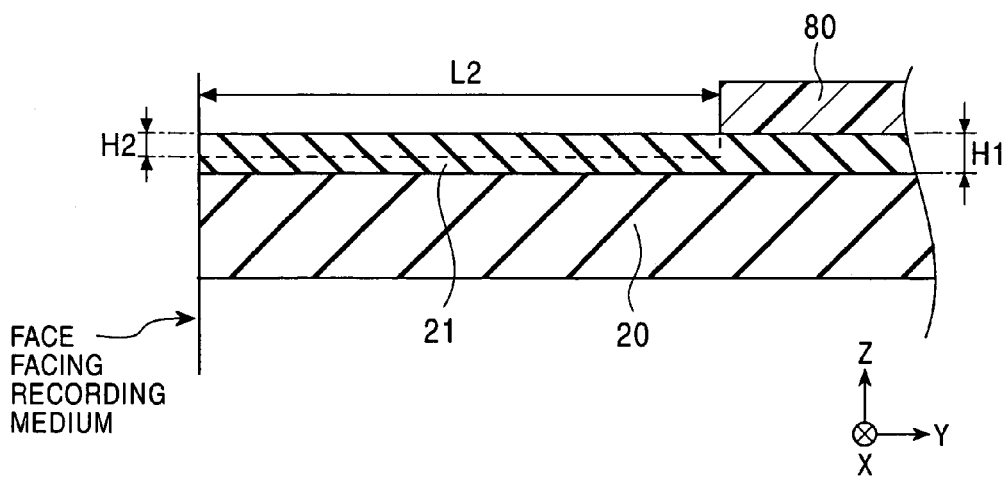
FIG. 10 is a step drawing illustrating a manufacturing step of the thin-film magnetic head shown in FIG. 1.

With the step shown in FIG. 10, an under layer 21 is formed on a slider (substrate) 20 formed of alumina-titanium-carbite or the like. The under layer 21 is formed of an insulating material of $Al_2O_3$ or the like, but other insulating materials may be used, or a multi-layered structure of insulating materials.

As shown in FIG. 10, a resist layer 80 is formed at a position on the under layer 21 distanced in the height direction from the face facing the recording medium. The lengthwise dimensions in the height direction from the face facing the recording medium to the resist layer 80 is L2, with the length dimensions L2 being formed within the range of 5 µm to 20 µm.

Next, the under layer 21 not covered with the resist layer 80 is etched down. The amount of etching is indicated by the dotted line in FIG. 10. For example, the film thickness H1 at the time of forming the under layer 21 is within the range of 2 µm to 4 µm, and the amount of etching H2 is within the range of 0.5 µm to 1.5 µm.

Figure 11:
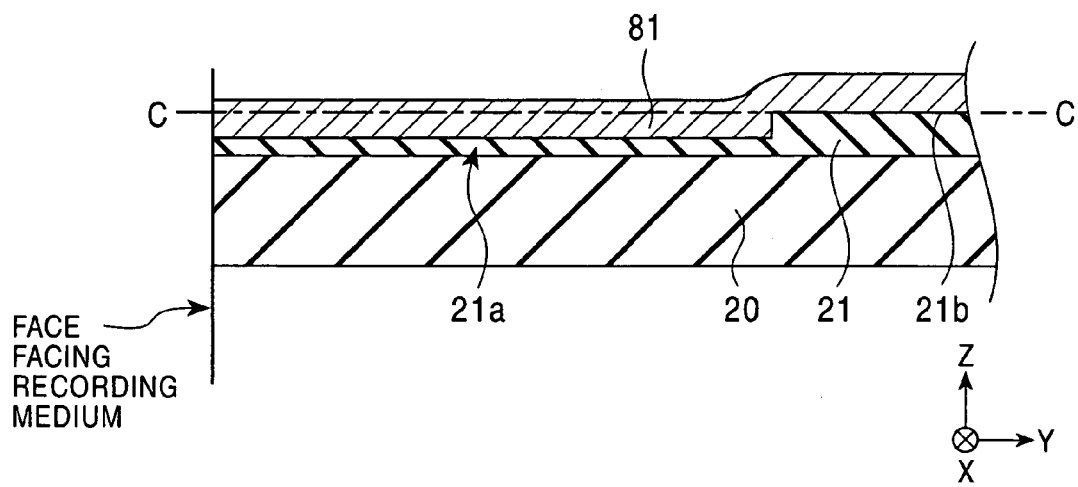
FIG. 11 is a step drawing illustrating a step following the step illustrated in FIG. 10.

In the step shown in FIG. 11, a magnetic material layer 81 to serve as the lower shield layer 22 is formed by sputtering film formation or the like, from within the first recess 21a formed by etching down the under layer 21 at the face facing the recording medium, to the under layer 21 hindwards in the height direction.

Then, as shown in FIG. 11, the magnetic material layer 81 is ground down to the dotted line C—C, leaving the magnetic material layer 81 within the first recess 21a at this time, while exposing the upper face 21b of the under layer 21 hindwards. Grinding down to the dotted line C—C can be performed using chemical mechanical polishing or the like, for example. The magnetic material layer 81 remaining within the first recess 21a becomes the lower shield layer 22.

Figure 12:
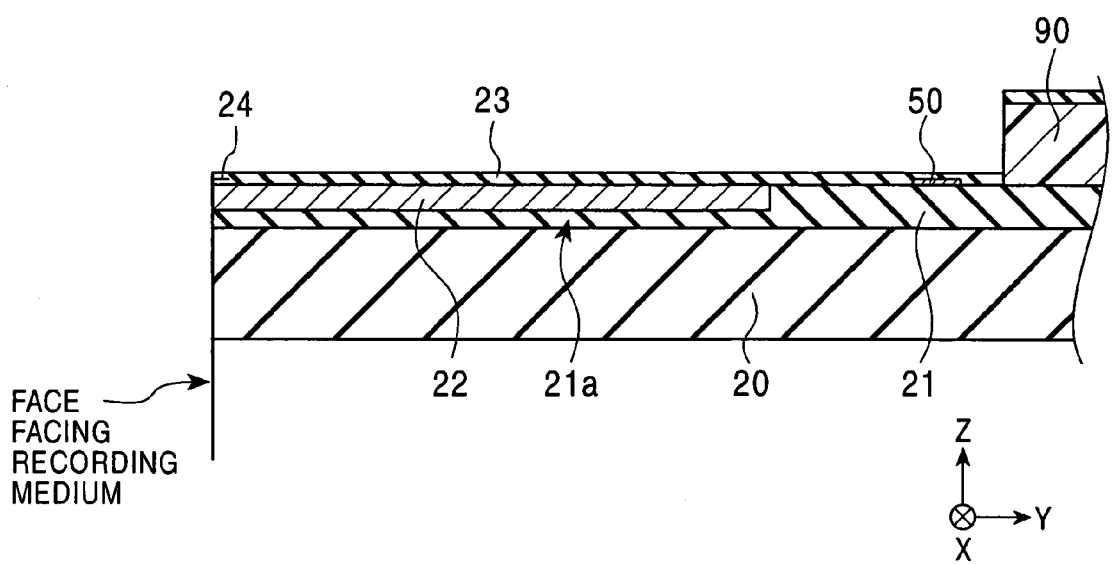
FIG. 12 is a step drawing illustrating a step following the step illustrated in FIG. 11.

With the step shown in FIG. 12, following forming an unshown lower gap layer on the lower shield layer 22, a magnetoresistance effect element 24 with the front edge face exposed from the face facing the recording medium is formed thereupon. In the steps in FIGS. 10 and 11, the lower shield layer 22 can be formed partially below the magnetoresistance effect element 24, so the floating magnetic field from the lower shield layer 22 at the time of forming the magnetoresistance effect element 24 can be reduced, thereby suppressing bending of the exposing beam at the time of forming the magnetoresistance effect element 24, so the magnetoresistance effect element 24 can be accurately formed in the predetermined shape.

Also, electrode extracting layers 50 and 51 (see FIG. 4) for supplying detecting current to the magnetoresistance effect element 24 are formed, and a resist layer 90 is formed on the under layer 21 hindwards in the height direction from the magnetoresistance effect element 24 and the electrode extracting layers 50 and 51.

Then, an upper gap layer is formed by sputtering or the like on the lower gap layer formed on the magnetoresistance effect element 24, the electrode extracting layers 50 and 51, the lower shield layer 22, and the under layer 21, which are not covered by the resist layer 90. In the drawings, the lower gap layer and the upper gap layer are collectively referred to as "gap layer". The resist layer 90 is then removed.

Figure 13:
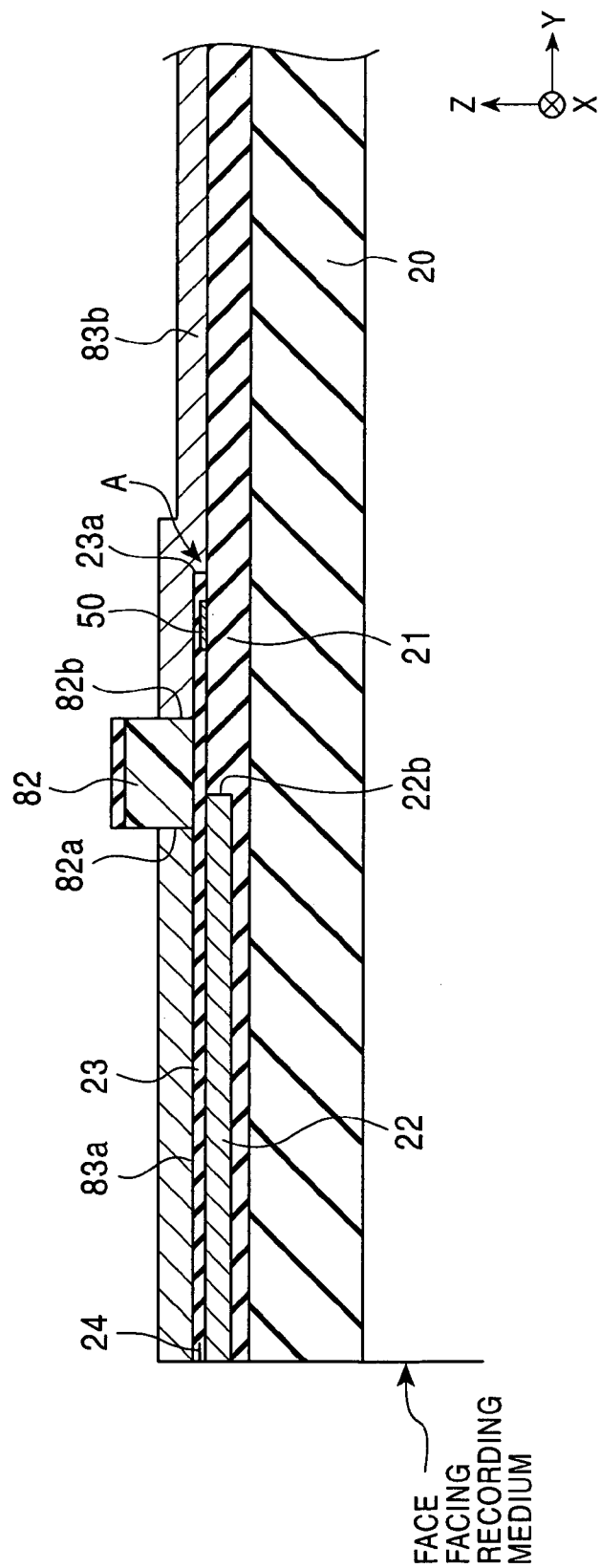
FIG. 13 is a step drawing illustrating a step following the step illustrated in FIG. 12.

In the step shown in FIG. 13, following partial formation of an electroplated base film (not shown) on the gap layer 23, a resist layer 82 is formed. The front edge face 82a of the resist layer 82 is formed at approximately the same position in the film thickness direction as the rear edge race 22b of the lower shield layer 22. Also, the rear edge face 82b of the resist layer 82 is preferably formed closer to the face facing the recording medium than the rear edge face 23a of the gap layer 23. Note that the distance in the height direction between the rear edge face 82b of the resist layer 82 and the rear edge face 23a of the gap layer 23 is the overlapping length of the second metal layer 28 onto the gap layer 23, described next.

Then, magnetic material layers 83a and 83b are formed on the gap layer 23 from the face facing the recording medium to the front edge face 82a of the resist layer 82, and from the rear edge face 82b of the resist layer 82 to the rear edge face 23a of the gap layer 23 and further onto the under layer 21 extending hindwards therefrom in the height direction.

The magnetic material layer 83a formed forwards from the resist layer 82 becomes the upper shield layer 27. On the other hand, the magnetic material layer 83b formed behind the resist layer 82 becomes the second metal layer 28. As shown in FIG. 13, a step A is formed between the upper face of the gap layer 23 and the under layer 21 extending hindwards therefrom, with the magnetic material layer 83b bending downwards over the step A from the upper face of the gap layer 23, and extending onto the under layer 21. The resist layer 82 is then removed, and the electroplated base film at those portions is removed.

Also, an arrangement may be made wherein, at the time of the step shown in FIG. 12, the resist layer 90 is not provided, rather, the gap layer 23 is formed for the time being on the entire face of the under layer 21 extending hindwards of the electrode extracting layers 50 and 51 in the height direction, following which the gap layer 23 in front of the electrode extracting layers 50 and 51 is covered with the resist layer, the part of the gap layer 23 and under layer 21 not covered by the resist layer is ground down, and the third recess 21d such as shown in FIG. 7 is provided in the under layer 21. In this case, performing the step in FIG. 13 results in the second metal layer 28 such as shown in FIG. 7 being embedded in the third recess 21d. Note that formation of the third recess 21d may be made in the step in FIG. 11. In either case, formation of the third recess 21d may be made at any time as long as before formation of the second metal layer 28.

Also, in the step in FIG. 13, an arrangement may be made wherein a resist layer is provided which covers everything from the front edge face 82a of the resist layer 82 hindwards in the height direction, and following formation of the upper shield layer 27 in front of the resist layer, the resist layer is removed, a resist layer is then newly provided which covers the rear edge face 82b of the resist layer 82 shown in FIG. 13 from above the upper shield layer 27, with the second metal layer 28 being formed behind the resist layer. That is to say, the upper shield layer 27 and the second metal layer 28 may be formed using separate steps. Thus, the material of the second metal layer 28 is not restricted to magnetic material, whereby the second metal layer 28 can be formed of a non-magnetic electroconductive material with more superb thermal conductivity.

The manufacturing steps shown in FIGS. 14 through 17 are partial longitudinal section views illustrating the formation method of the thin-film magnetic head shown in FIG. 6. The step drawings illustrated in FIGS. 14 through 17 are for the formation method of the lower shield layer and up to the first metal layer, and the formation method of layers thereabove will not be described in particular.

Figure 14:
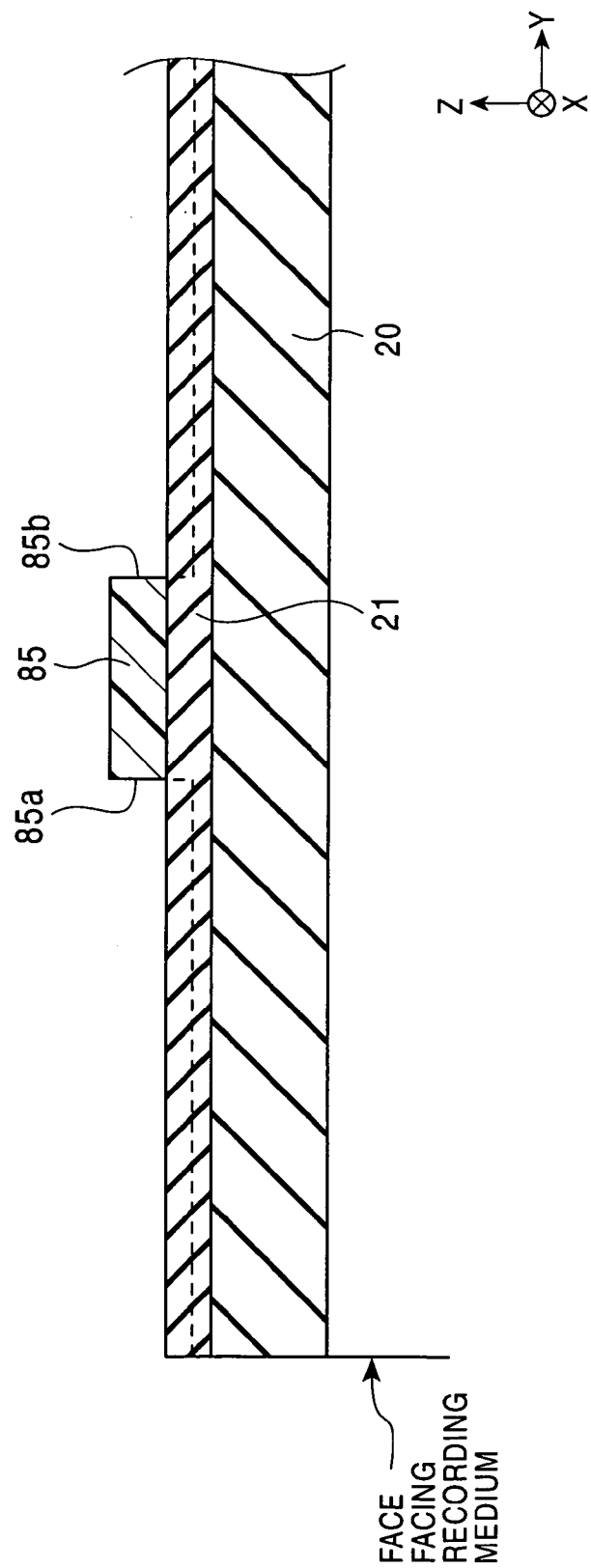
FIG. 14 is a step drawing illustrating a manufacturing step of the thin-film magnetic head shown in FIG. 6.

In the step shown in FIG. 14, an under layer 21 formed of $Al_2O_3$ or the like is formed on the slider 20, and a resist layer 85 is formed on the under layer 21. The resist layer 85 is partially formed at a position distanced from the face facing the recurring medium in the height direction. The lengthwise dimension in the height direction from the face facing the recurring medium to the front edge face 85a of the resist layer 85 is L2, the same as in FIG. 10.

As shown in FIG. 14, the under layer 21 in a region forward of the front edge face 85a and a region hindwards of the rear edge face 85b, not covered by the resist layer 85, is removed by etching or the like, to a predetermined depth. The recess engraved in the forward region is the first recess 21a, and the recess engraved in the hindward region is the second recess 21c. The amount of engraving is indicated by dotted lines in FIG. 14.

Figure 15:
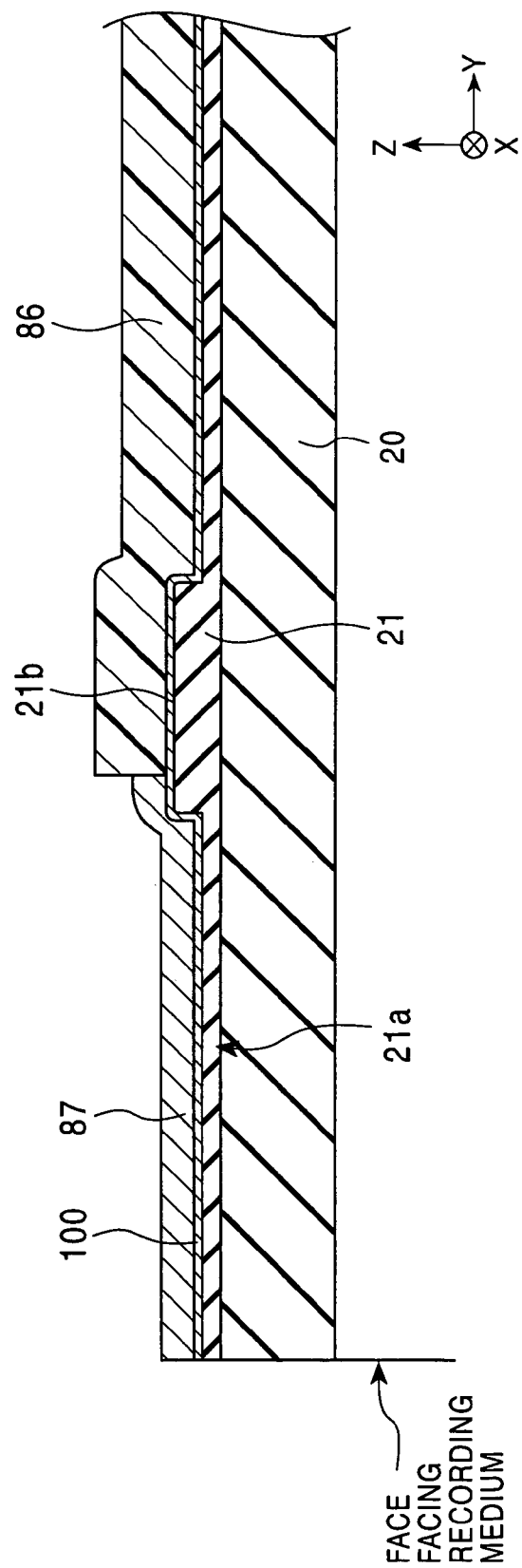
FIG. 15 is a step drawing illustrating a step following the step illustrated in FIG. 14.

In the step shown in FIG. 15, next, an electroplated base layer 100 formed of NiFe, Ti/Au, CuNi, Ti/Cu, or the like, is formed by sputtering or the like on the first recess 21a formed at the side of the under layer 21 toward the face facing the recording medium, and the upper face 21b of the under layer 21 continuing from the first recess 21a. Subsequently, with the exception of above the first recess 21a and a part of the upper face 21b of the under layer 21 continuing from the first recess 21a, the under layer 21 hindwards therefrom is covered with a resist layer 86.

Then, within the first recess 21a and the upper face 21b of the under layer 21 not covered with the resist layer 86 has formed thereupon by electroplating a magnetic material layer 87 to serve as a shield layer. The magnetic material layer 87 is also formed on the resist layer 86. The resist layer 86 is then removed.

Figure 16:
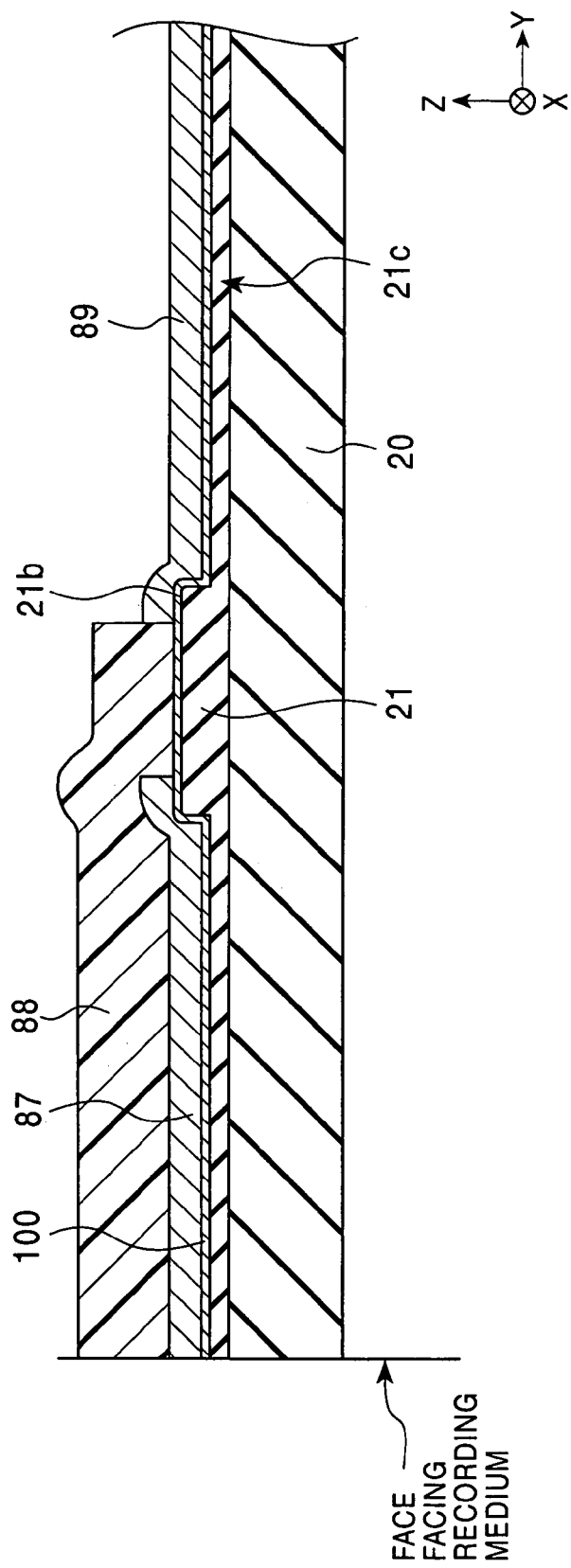
FIG. 16 is a step drawing illustrating a step following the step illustrated in FIG. 15.

In the step shown in FIG. 16, next, the magnetic material layer 87 is covered with a resist layer 88, as well as a part of the upper face 21b of the under layer 21 extending hindwards therefrom. Then, a non-magnetic electroconductive material layer 89 is formed by electroplating or the like on a part of the upper face 21b of the under layer 21 not covered by the resist layer 88, and in the second recess 21c. The resist layer 88 is then removed.

Figure 17:
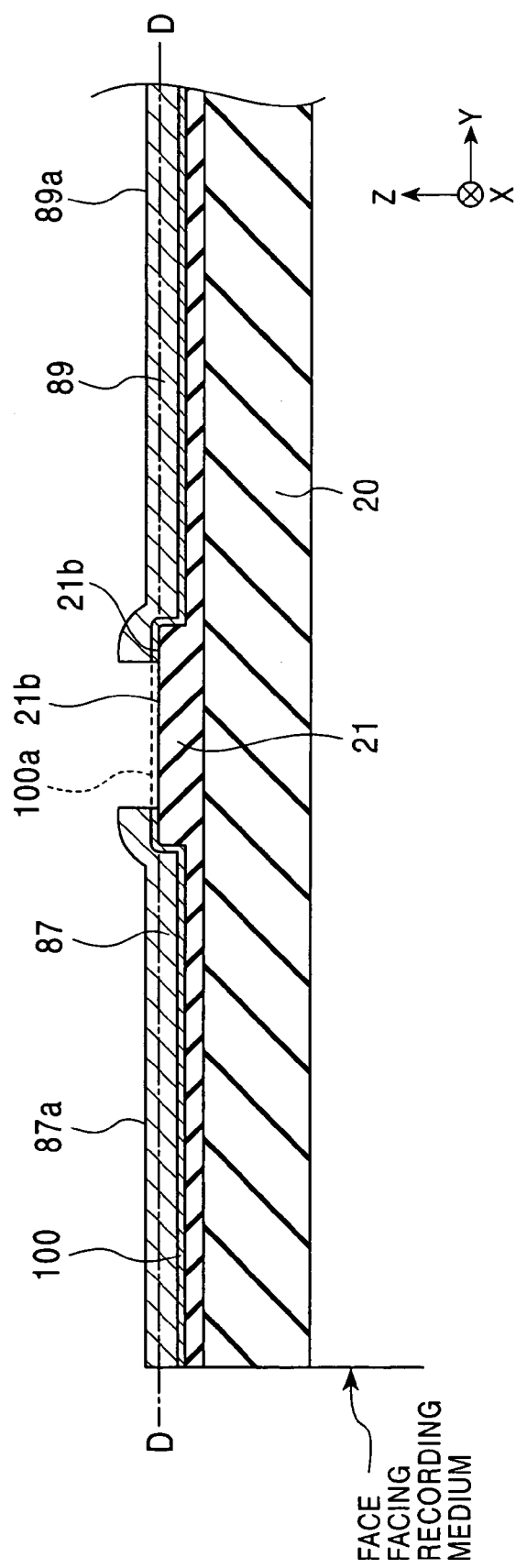
FIG. 17 is a step drawing illustrating a step following the step illustrated in FIG. 16.

Next, in the step in FIG. 17, the electroplated base layer 100a exposed between the magnetic material layer 87 and the non-magnetic electroconductive material layer 89 is removed by etching or the like.

Then, the magnetic material layer 87, non-magnetic electroconductive material layer 89, and upper face 21b of the under layer 21 are ground down to the dotted line D—D so that the magnetic material layer 87 remains in the first recess 21a and the non-magnetic electroconductive material layer 89 in the second recess 21c, and the upper face 87a of the magnetic material layer 87, the upper face 21b of the under layer 21, and the upper face 89a of the non-magnetic electroconductive material layer 89, are formed into a single smoothed face. The magnetic material layer 87 embedded in the first recess 21a makes up the lower shield layer, and the non-magnetic electroconductive material layer 89 embedded in the second recess 21c makes of the first metal layer 60.

Employing the steps illustrated in FIGS. 14 through 17 enable the magnetic material layer 87 to be formed in the first recess 21a and the non-magnetic electroconductive material layer 89 in the second recess 21c, thereby forming layers of different material in the respective recesses.

In the event of making the layers to be embedded within the first recess 21a and the second recess 21c to be both magnetic material layers, formation can be made with an even easier method. That is to say, the resist layer 85 in the step in FIG. 14 is used as it is, with within the first recess 21a forwards of the resist layer 85 and the second recess 21c hindwards of the resist layer 85 being embedded with the magnetic material layer by sputtering film formation or the like, following which the resist layer 85 is removed and the step for smoothing the upper faces of the magnetic material layers and the upper face 21b of the under layer 21 is carried out, thereby embedding the magnetic material layer within both the first recess 21a and the second recess 21c.

The upper shield layer 27 and second metal layer 28 shown in FIG. 6 can be formed using the same steps as in FIGS. 12 and 13.

The above has been a description of the manufacturing method of the thin-film magnetic head according to the present invention with reference to FIGS. 10 through 17, and according to the present invention, the lower shield layer 22 is formed embedded in the first recess 21a formed in the under layer 21, whereby the under layer 21 exists hindwards of the lower shield layer 22, and accordingly an insulating material layer for filling in behind the lower shield layer 22 in the height direction is unnecessary. Accordingly, manufacturing costs of the thin-film magnetic head can be reduced.

Also, employing the steps illustrated in FIGS. 10 through 17 enable the distance between the lower shield layer 22 and the slider 20 and the distance between the second metal layer 28 and the slide 20 to be reduced without increasing the complexity of the manufacturing steps in comparison with conventional arrangements, and accordingly a thin-film magnetic head with excellent thermal dissipation effects can be easily and suitably formed.

The thin-film magnetic head according to the present invention thus described above is built into a magnetic head device mounted in hard disk devices and the like, for example. The thin-film magnetic head may be built into either a floating magnetic head or contact magnetic head. Also, the thin-film magnetic head may be used for magnetic sensors and the like, other than hard disk devices.

What is claimed is:

1. A thin-film magnetic head comprising a lower shield layer and upper shield layer, and a magnetoresistance effect element between both shield layers;
   wherein said lower shield layer is formed on an under layer that is in contact with a substrate at the bottom, wherein said under layer comprises a first recess, which extends in a height direction from a face facing a recording medium, and said lower shield layer is formed within the first recess, and said under layer further comprises a second recess which extends in the height direction, separated from a rear end face of said lower shield layer by a first distance and behind in the height direction, wherein a first metal layer is formed within the second recess;
   wherein an upper face of said lower shield layer, an upper face of said under layer, and an upper face of said first metal layer form a continuous planar layer;
   wherein said under layer extends under and along the height direction of said lower shield layer and said first metal layer; and
   wherein the spacing between the lower shield layer and said first metal layer is within the range of 2 μm to 10 μm.

2. A thin-film magnetic head according to claim 1, wherein said first metal layer is a nonmagnetic electroconductive material.

3. A thin-film magnetic head according to claim 1, wherein an electrode extracting layer for supplying electric current is connected to said magnetoresistance effect element, with an insulating layer provided from above said magnetoresistance effect element over said electrode extracting layer, and with said first metal layer extending hindward from said insulating layer in the height direction, and said upper shield layer provided upon said insulating layer, and wherein at least a part of a second metal layer provided at a position separated in the height direction from said upper shield layer by a second distance is formed connected to said first metal layer.

4. A thin-film magnetic head according to claim 3, wherein said second metal layer extends in the height direction from an upper face of said insulating layer and bends downwards at a rear edge face of said insulating layer, and also extends hindwards from said insulating layer over said first metal layer.

5. A thin-film magnetic head according to claim 3, wherein a recording head portion, having a lower core layer, upper core layer, and coil layer, is provided upon said upper shield layer; and
wherein a third metal layer formed separately from said lower core layer is provided behind said lower core layer in the height direction, with at least part of the third metal layer formed in contact with a top of said second metal layer.

6. A thin-film magnetic head according to claim 3, wherein a recording head portion, having a lower core layer, upper core layer, and coil layer, is provided upon said upper shield layer;
wherein a third metal layer formed separately from said lower core layer is provided behind the lower core layer in the height direction; and
wherein a gap is formed between said third metal layer and said second metal layer, with a connecting layer provided to at least a part of within said gap, so that said third metal layer and said second metal layer are connected via said connecting layer.

7. A thin-film magnetic head according to claim 3, wherein a recording head portion, having a lower core layer, upper core layer, and coil layer, is provided upon said upper shield layer; and
wherein said lower core layer has a hindward region formed extending to a position facing said second metal layer in a film-thickness direction.

8. A thin-film magnetic head according to claim 7, wherein a gap is formed between the hindward region of said lower core layer and said second metal layer, with a connecting layer provided to at least a part of within said gap, so that said hindward region and said second metal layer are connected via said connecting layer.

9. A thin-film magnetic head comprising a lower shield layer and upper shield layer, and a magnetoresistance effect element between both shield layers;
wherein an electrode extracting layer for supplying electric current is connected to said magnetoresistance effect element, with an insulating layer provided from above said magnetoresistance effect element over said electrode extracting layer;
wherein said upper shield layer is formed upon said insulating layer, and wherein at least a part of a second metal layer provided at a position separated in a height direction from said upper shield layer by a predetermined distance is formed on a layer lower than an upper face of said insulating layer extending hindwards in the height direction from a rear edge face of said insulating layer;
wherein said lower layer is an under layer that is in contact with a substrate at the bottom;
wherein a first recess extending in the height direction from a face facing a recording medium is formed in said under layer at a position closer to said facing face than the position at which said second metal layer is formed, with said lower shield layer being formed within the first recess; and
wherein a second recess is formed on said under layer at a position where said second metal layer comes into contact with an upper face of said under layer, with said second metal layer being embedded in the second recess.

10. A thin-film magnetic head according to claim 9, wherein said second metal layer extends in the height direction from the upper face of said insulating layer and bends downwards at the rear edge face of said insulating layer, and is formed over the layer lower than the upper face of said insulating layer, extending hindwards from said insulating layer.

11. A thin-film magnetic head according to claim 9, wherein a recording head portion, having a lower core layer, upper core layer, and coil layer, is provided upon said upper shield layer; and
wherein a third metal layer formed separately from said lower core layer is provided behind said lower core layer in the height direction, with at least part of the third metal layer formed coming into contact with a top of said second metal layer.

12. A thin-film magnetic head according to claim 9, wherein a recording head portion, having a lower core layer, upper core layer, and coil layer, is provided upon said upper shield layer;
wherein a third metal layer formed separately from said lower core layer is provided behind the lower core layer in the height direction; and
wherein a gap is formed between said third metal layer and said second metal layer, with a connecting layer provided to at least a part of within said gap, so that said third metal layer and said second metal layer are connected via said connecting layer.

13. A thin-film magnetic head according to claim 9, wherein a recording head portion, having a lower core layer, upper core layer, and coil layer, is provided upon said upper shield layer; and
wherein said lower core layer has a hindward region formed extending to a position facing said second metal layer in a film-thickness direction.

14. A thin-film magnetic head according to claim 13, wherein a gap is formed between the hindward region of said lower core layer and said second metal layer, with a connecting layer provided to at least a part of within said gap, so that said hindward region and said second metal layer are connected via said connecting layer.

* * * * *